US009982652B2

(12) United States Patent
Peleg

(10) Patent No.: US 9,982,652 B2
(45) Date of Patent: May 29, 2018

(54) SYSTEM AND METHOD FOR INSERTION AND EXTRACTION OF A DEVICE TO AND FROM A FLUID-CONTAINING BODY

(71) Applicant: HYDROSPIN MONITORING SOLUTIONS LTD., Netanya (IL)

(72) Inventor: Dani Peleg, Kiryat Tivon (IL)

(73) Assignee: HYDROSPIN MONITORING SOLUTIONS LTD., Netanya (IL)

( * ) Notice: Subject to any disclaimer, the term of this patent is extended or adjusted under 35 U.S.C. 154(b) by 94 days.

(21) Appl. No.: 15/028,910

(22) PCT Filed: Oct. 21, 2014

(86) PCT No.: PCT/IL2014/050909
§ 371 (c)(1),
(2) Date: Apr. 12, 2016

(87) PCT Pub. No.: WO2015/059694
PCT Pub. Date: Apr. 30, 2015

(65) Prior Publication Data
US 2016/0252072 A1    Sep. 1, 2016

(30) Foreign Application Priority Data

Oct. 21, 2013 (IL) .......................................... 228997

(51) Int. Cl.
*F16K 51/00* (2006.01)
*F03B 17/06* (2006.01)
(Continued)

(52) U.S. Cl.
CPC .............. *F03B 17/06* (2013.01); *F03B 13/00* (2013.01); *F16K 1/12* (2013.01); *F16K 31/60* (2013.01);
(Continued)

(58) Field of Classification Search
CPC ......... Y10T 137/612; F17D 3/10; F03B 17/06
(Continued)

(56) References Cited

U.S. PATENT DOCUMENTS 2,035,472 A    3/1936    Hammond
2,870,629 A    1/1959    Willis
(Continued)

OTHER PUBLICATIONS

Spirax Sarco "Turbo Bar"—Installation and Maintenance Instructions, 48 pages, Dec. 2009.
(Continued)

*Primary Examiner* — Reinaldo Sanchez-Medina
(74) *Attorney, Agent, or Firm* — Dorsey & Whitney LLP

(57) ABSTRACT

A system for use with a fluid-containing body having a body wall with an opening and defining a body interior, and for use with a device to be inserted and extracted by said system via said opening into the fluid-containing body, said system having a central axis and comprising: a proximal portion configured for being attached to the body wall when mounting the system in said opening, and having a first chamber configured for receiving said device therein; a sealable interface having a first side facing said first chamber and a second side in a direction opposite said first chamber and defining a distal area configured for receiving said device from said first chamber; said sealable interface, when unsealed, being configured to allow passage therethrough of the device along said central axis between the first chamber and the distal area; a pressure regulating mechanism configured for regulating pressure within said first chamber between pressure at an upper exterior of the proximal portion and pressure at the distal area; and a second chamber encompassing at least a part of the distal area and configured for receiving the device therein; said sealable interface, when unsealed, being configured to allow passage therethrough of the device along said central axis between the first and the second chambers.

18 Claims, 15 Drawing Sheets

(51) Int. Cl.
*F03B 13/00* (2006.01)
*F16K 1/12* (2006.01)
*F16K 31/60* (2006.01)
*F16L 13/02* (2006.01)
*F16L 41/04* (2006.01)
*F16L 41/08* (2006.01)

(52) U.S. Cl.
CPC .............. *F16L 13/02* (2013.01); *F16L 41/04* (2013.01); *F16L 41/086* (2013.01); *F05B 2220/20* (2013.01); *F05B 2220/602* (2013.01); *F05B 2250/82* (2013.01); *Y02B 10/50* (2013.01); *Y02E 10/28* (2013.01)

(58) Field of Classification Search
USPC .......................................... 137/317, 320, 321
See application file for complete search history.

(56) References Cited

U.S. PATENT DOCUMENTS

| | | | |
|---|---|---|---|
| 4,152,936 A | | 5/1979 | Boykin et al. |
| 4,345,613 A | * | 8/1982 | Mills .......................... F16T 1/00 137/152 |
| 4,346,611 A | * | 8/1982 | Welker ..................... G01N 1/14 73/863.86 |
| 4,631,967 A | * | 12/1986 | Welker ................. G01F 15/185 73/861.25 |
| 5,996,430 A | * | 12/1999 | Bellis, Sr. ............ G01N 1/2035 73/756 |
| 6,338,359 B1 | * | 1/2002 | Welker ..................... F17D 3/10 137/15.12 |
| 2004/0101025 A1 | | 5/2004 | Welker |

OTHER PUBLICATIONS

International Search Report for International Application No. PCT/IL2014/050909 dated Dec. 23, 2014.

* cited by examiner

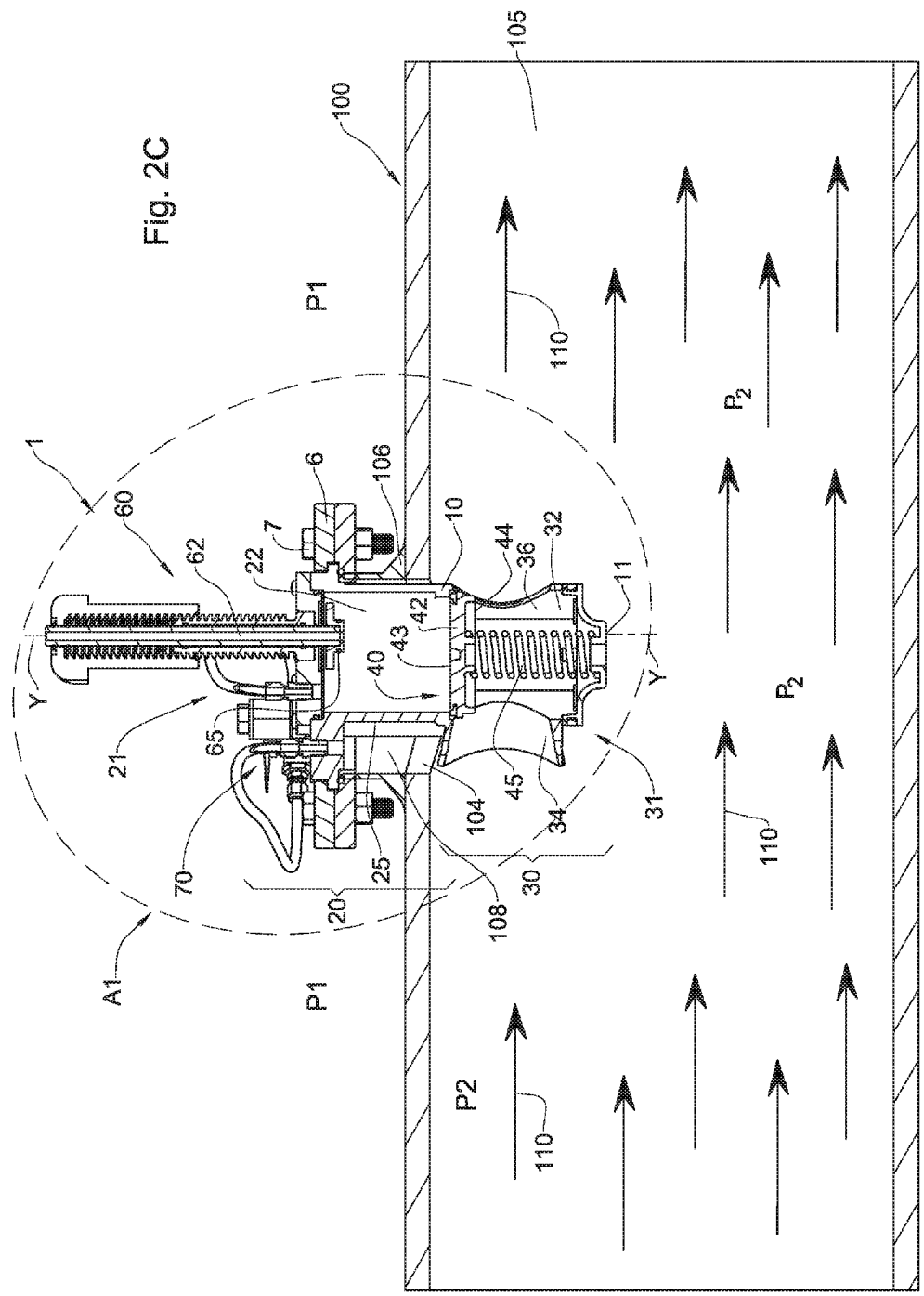

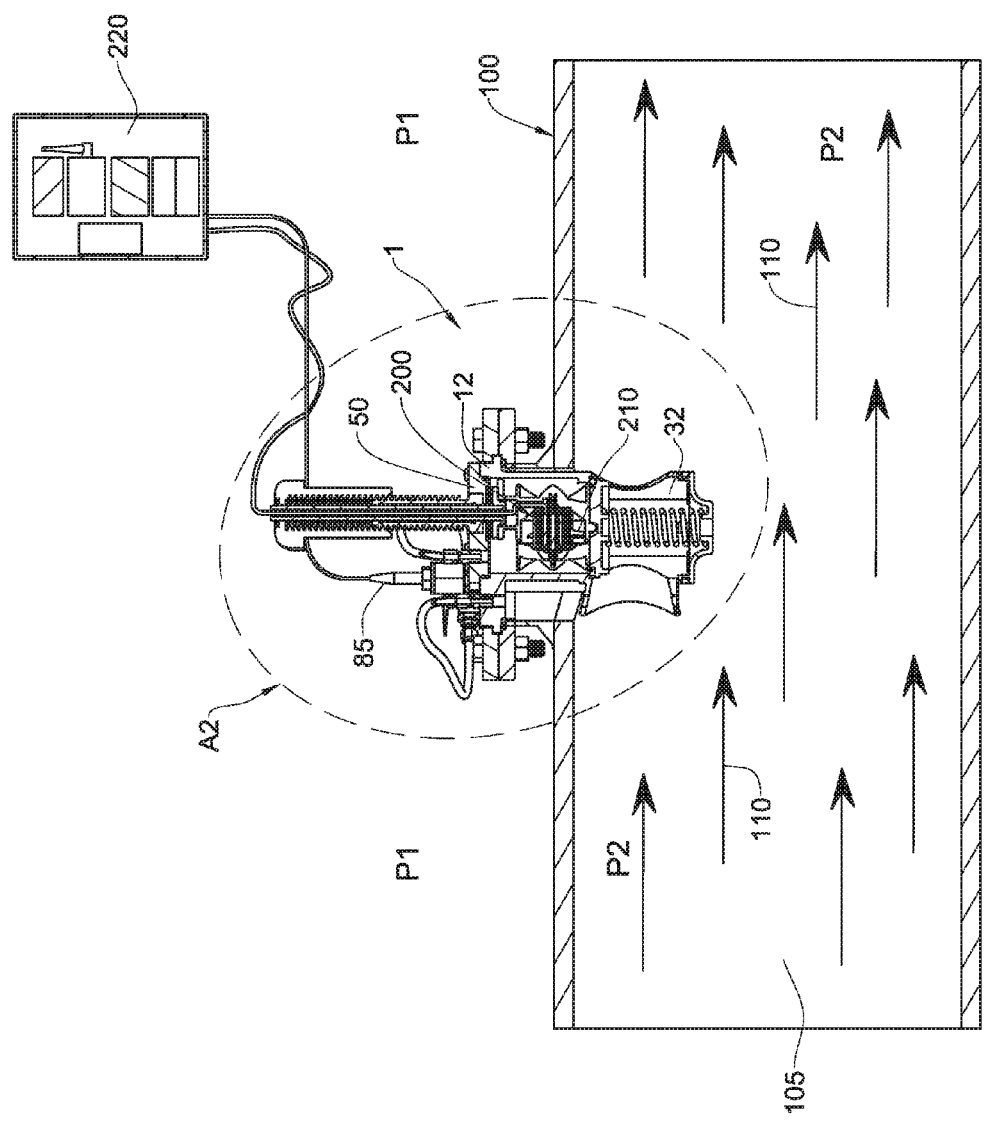

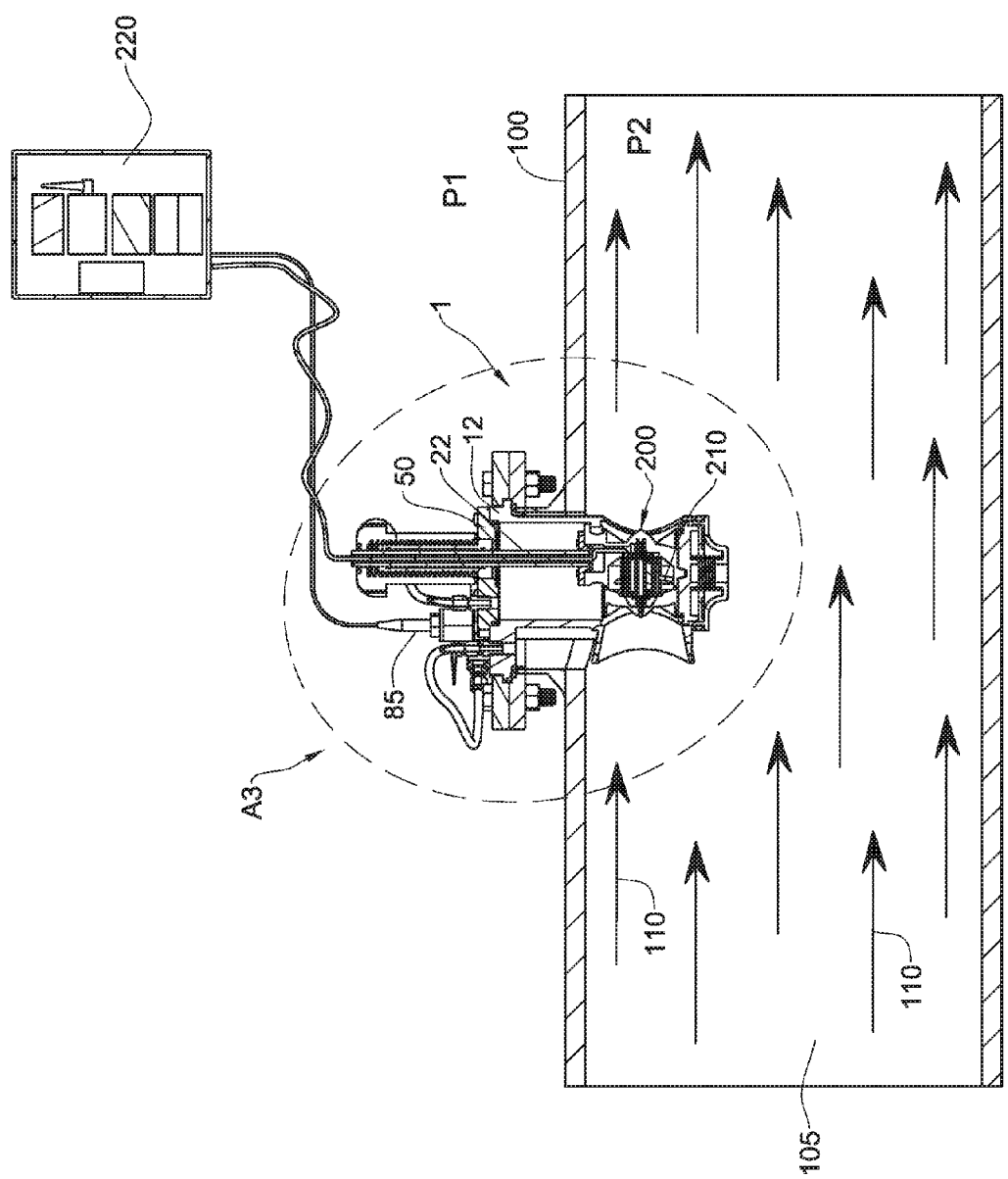

SYSTEM AND METHOD FOR INSERTION AND EXTRACTION OF A DEVICE TO AND FROM A FLUID-CONTAINING BODY

TECHNOLOGICAL FIELD

This presently disclosed subject matter relates to the field of fluid-containing bodies, and more particularly to a system and a method for introducing devices into the fluid-containing bodies.

BACKGROUND

Fluid-containing bodies such as pipe are widely used for delivering fluid from place to place. In order to control this operation and/or for exploiting the fluid for electric energy generation, it is sometimes required to introduced various devices into the pipe while being under fluid pressure.

There are many known techniques for introduced a device into a pipe under fluid pressure. One such technique is hot tapping. In general, typical applications of hot tapping include making a branch connection, initiating a bypass, allowing performance of a line stop and introducing a device into a pipe under pressure. Components required to perform a hot tap normally include a fitting designed to contain system pressure, a valve used to control the new connection and a drilling or tapping machine.

One example of a prior art reference is U.S. Pat. No. 2,870,629 which discloses an apparatus for moving an element into and from a vessel containing liquid under pressure.

GENERAL DESCRIPTION

According to one aspect of the presently disclosed subject matter, there is provided a system for use with a fluid-containing body having a body wall with an opening and defining a body interior, and for use with a device to be inserted and extracted by the system via the opening into the fluid-containing body. The system has a central axis and comprises: a proximal portion configured for being attached to the body wall when mounting the system in said opening, and having a first chamber configured for receiving said device therein; a sealable interface having a first side facing said first chamber and a second side in a direction opposite said first chamber and defining a distal area configured for receiving said device from said first chamber; said sealable interface, when unsealed, being configured to allow passage therethrough of the device along said central axis between the first chamber and the distal area; and a pressure regulating mechanism configured, for regulating pressure within said first chamber between pressure at an upper exterior of the proximal portion and pressure at the distal area.

The term 'fluid-containing body' refers hereinafter in the specification and the claims to a body in form of a pipe, a tube, a conduit, a duct, a canal, a channel, a vessel, a hose, a tank, or a container in which fluid (e.g., gas or liquid) can be contained or conveyed at a pressure substantially different from the ambient pressure (i.e., the pressure outside the fluid-containing body). In particular, the pressure within the fluid-containing body can be higher than the ambient pressure.

The term 'device' refers hereinafter in the specification and the claims to any mechanical and/or electric equipment which may be introduced into a fluid-containing body. For example, the device can be an energy generating unit with a rotor and a stator, being introduced in a fluid-containing body in form of a pipe for generating energy by transforming the flow energy of fluid therein into an electric power. According to other examples, the device can be constituted by one or more sensing units which collect data being associated with the fluid within the pipe. This data can include chemical and physical properties of the fluid such as conductivity, pH, salt content, turbidity, chlorine content, and dissolved oxygen content.

The phrase "upper exterior of the proximal portion" refers hereinafter in the specification and the claims at least to an area located outside the system and outside the fluid-containing body in which the system is accommodated. According to a particular example, this area can include an air being at an atmospheric pressure.

When the system is mounted within the fluid-containing body, the first chamber constitutes a pressure regulation chamber in which the pressure can be regulated by the pressure regulating mechanism between the pressure outside the system and the fluid-containing body and pressure at the body interior. In addition, the distal area is in fluid communication with the fluid disposed within the body interior.

The system can comprise a second chamber encompassing at least a part of the distal area and configured for receiving the device therein. The sealable interface, when unsealed, can allow passage therethrough of the device along the central axis between the first and the second chambers.

The system according to the above aspect is configured for facilitating insertion of a device to an interior of the fluid-containing body (i.e., into its distal area), having a fluid pressure that is higher than the ambient pressure (i.e., the pressure outside the fluid-containing body and the system). The insertion of the device into the fluid-containing body is facilitated due to operation of a pressure regulating mechanism, being used for equaling the fluid pressure within the fluid-containing body at the distal area (i.e., the pressure of the fluid) with the pressure within the first chamber containing the device (while the pressure within the first chamber is equal to the pressure at the upper exterior of the proximal portion, i.e., the ambient pressure), thereby reducing pressure difference therebetween. This equaling results in reduction of resistance during the insertion of the device into the body interior. When the pressure within the first chamber becomes equal to the fluid pressure at the distal area, extraction of the device from the fluid-containing body into the first chamber is also facilitated.

The pressure regulating mechanism can be configured for regulating the pressure within the first chamber by allowing the fluid from the body interior to enter into the first chamber and by allowing said fluid to escape from the first chamber.

The pressure regulating mechanism can comprise a pressure regulating valve having a first portion configured for defining a first fluid path with the distal area, and a second portion configured for defining a second fluid path with said first chamber. The pressure regulating valve can be configured for assuming an open state in which fluid communication is established between said first and second fluid paths, thereby increasing pressure within the first chamber to the pressure at the distal area, and a closed state in which fluid communication between the first and the second fluid paths is obstructed.

In addition, the pressure regulating mechanism can be used for equaling the pressure at the upper exterior of the proximal portion (i.e., the ambient pressure) with the pressure within the first chamber, thereby providing access to the first chamber for insertion and extraction of the device therefrom, while the pressure within the first chamber is equal to the ambient pressure. The ambient pressure can be an atmospheric pressure. For this equaling, the pressure regulating mechanism can comprise a pressure pressure releasing valve having a third portion configured for defining a third fluid path between the first chamber and the upper exterior of the proximal portion for reducing pressure within the first chamber to the pressure at the upper exterior of the proximal portion.

When the system is mounted within the fluid-containing body, the second chamber can be configured to be exposed to the body interior along a part of its circumference via at least one chamber opening formed therein.

The second chamber can have a bottom opposite the interface, with an inner surface facing an interior of the second chamber, and an outer surface facing the body wall.

The interface can be constituted by an isolating valve configured for assuming a sealed state, in which the interface is sealed, and an unsealed state in which the interface is unsealed.

The isolating valve can comprise a stopper movable at least along said central axis for providing the sealed and the unsealed states of the isolating valve.

The isolating valve can further comprise an actuator configured for moving the stopper towards the first chamber, thereby causing the isolating valve to assume its sealed state.

The actuator and the stopper can be disposed within the second chamber, and the actuator can be associated with the bottom of the second chamber.

The system can further comprise a cover selectively engageable with the proximal portion for providing access to the first chamber for insertion of said device therein, and for sealing the first chamber, at least when the interface is sealed.

The cover comprises an aperture configured for allowing the second fluid path to pass therethrough into the first chamber.

When the system is mounted within the opening, an exterior surface of the proximal portion and a portion of the body wall can be configured to form a space therebetween, constituting at least a part of the first fluid path.

The first and the second chambers can be integrally formed along the central axis.

When said system is mounted within the opening, the distal area can be in fluid communication with fluid within the body interior and the pressure regulating mechanism is configured for regulating pressure within the first chamber between pressure at an exterior of the system and the fluid-containing body and pressure of said fluid. The system can further comprise a pushing mechanism with a pusher having and upper position and a lower position. The pusher can be configured for displacing the device along the central axis between the upper position in which the device is received within the first chamber and the lower position in which the device is received within the second chamber.

According to another aspect of the presently disclosed subject matter, there is provided a system for use with a fluid-containing body having a body wall with an opening and defining a body interior with a fluid therein, and for use with a device to be inserted and extracted by said system via said opening into the fluid-containing body. The system has a central axis and comprises: a proximal portion configured for being attached to the body wall when mounting the system in said opening, and having a first chamber configured for receiving said device therein; a sealable interface having a first side facing said first chamber and a second side in a direction opposite said first chamber and defining a distal area configured to be in fluid communication with said fluid, and for receiving said device from said first chamber; said sealable interface, when unsealed, being configured to allow passage therethrough of the device along said central axis between the first chamber and the distal area; and a pressure regulating mechanism configured, when the system being mounted within the opening, for regulating pressure within said first chamber between pressure at an exterior of the system and the fluid-containing body and pressure of said fluid within said body interior.

The pressure regulating mechanism can be configured for regulating the pressure within the first chamber by allowing said fluid to enter into the first chamber and by allowing said fluid to escape from the first chamber.

The system can have a second chamber encompassing at least a part of the distal area and configured for receiving the device therein. The sealable interface, when unsealed, can be configured to allow passage therethrough of the device along said central axis between the first and the second chambers.

The pressure regulating mechanism can comprise a pressure regulating valve having a first portion configured for defining a first fluid path with the fluid within the body interior, and a second portion configured for defining a second fluid path with said first chamber; said pressure regulating valve being configured for assuming an open state in which fluid communication is established between said first and second fluid paths, thereby increasing pressure within the first chamber to the pressure of said fluid within the body interior, and a closed state in which fluid communication between the first and the second fluid paths is obstructed.

The pressure regulating mechanism can further comprise a pressure releasing valve having a third portion configured for defining a third fluid path between the first chamber and the exterior of the system and the fluid-containing body. The pressure releasing valve can be configured for reducing pressure within the first chamber to the pressure at the exterior of the system and the fluid-containing body.

At least when the interface is sealed, the second chamber can be configured to be exposed to the fluid along a part of its circumference via at least one chamber opening formed therein.

The second chamber can have a bottom opposite the interface, with an inner surface facing an interior of the second chamber, and an outer surface configured for facing said body wall.

The interface can be constituted by an isolating valve configured for assuming a sealed state, in which the interface is sealed, and an unsealed state in which the interface is unsealed.

The isolating valve can comprise a stopper movable at least along said central axis for providing the sealed and the unsealed states of the isolating valve.

The isolating valve can further comprise an actuator configured for moving said stopper toward the first chamber, thereby causing the isolating valve to assume its sealed state.

The actuator and said stopper can be disposed within the second chamber. The actuator can be associated with the bottom of the second chamber.

The system can further comprise a cover selectively engageable with the proximal portion for providing access to the first chamber for insertion of said device therein, and for sealing the first chamber, at least when the interface is sealed.

The cover can comprise an aperture configured for allowing said second fluid path to pass therethrough into said first chamber.

When said system is mounted within the opening, an exterior surface of the proximal portion and a portion of the body wall can be configured to form a space therebetween, constituting at least a part of the first fluid path.

The system can further comprise a pushing mechanism with a pusher having and upper position and a lower position. The pusher can be configured for displacing the device along the central axis between the upper position in which the device is received within the first chamber and the lower position in which the device is received within the second chamber.

According to another aspect of the presently disclosed subject matter, there is provided a method for mounting a device within a fluid-containing body having a body wall with an opening configured for receiving the device therethrough and defining a body interior with a fluid therein, said method comprising steps of:

a. providing a system being mounted in said opening, said system having a central axis and comprising: a proximal portion having a first chamber; a sealable interface having a first side facing said first chamber and a second side in a direction opposite said first chamber and defining a distal area configured to be in fluid communication with said fluid; and a pressure regulating mechanism configured for regulating pressure within said first chamber;
b. inserting the device into the first chamber while said interface being sealed and the pressure within said first chamber being equal to pressure at the exterior of the system and the fluid-containing body;
c. sealing the first chamber;
d. increasing the pressure within the first chamber, by said pressure regulating mechanism, to the pressure of said fluid within said body interior;
e. unsealing the interface, thereby allowing passage of the device therethrough along said central axis from the first chamber to the distal area; and
f. transferring the device from the first chamber to the distal area, thereby accommodating the device at the distal area.

The method can further comprise a step of providing said system with a second chamber encompassing at least a part of the distal area; and configured for receiving the device therein; and wherein in said step of transferring the device from the first chamber to the distal area, the device is accommodated within the second chamber.

The method can further comprise steps of: mounting the system in said opening; attaching the proximal portion to the body wall; exposing said second chamber to the fluid within the body interior via at least one chamber opening formed therein, thereby allowing said second chamber to be in fluid communication with said fluid.

The method can further comprise a step of transferring the device between the first and the second chambers, thereby triggering unsealing and sealing of the interface, respectively.

The method can further comprise steps of: providing the pressure regulating mechanism with a pressure regulating valve having a first portion defining a first fluid path with the fluid within the body interior, and a second portion defining a second fluid path with said first chamber; assuming an open state in which fluid communication is established between said first and second fluid paths, thereby increasing pressure within the first chamber to the pressure of said fluid within the body interior; and assuming a closed state in which fluid communication between the first and the second fluid paths is obstructed.

The method can further comprise steps of: providing the pressure regulating mechanism with a pressure releasing valve having a third portion configured for defining a third fluid path between the first chamber and the upper the exterior of the system and the fluid-containing body; and reducing fluid pressure within the first chamber to the pressure at an exterior of the system and the fluid-containing body by allowing said fluid to escape from the first chamber to the the exterior of the system and the fluid-containing body, thereby providing access to first chamber for insertion or extraction of the device therefrom.

The method can further comprise steps of: providing the interface as an isolating valve configured for assuming a sealed state and an unsealed state; causing the isolating valve to assume its unsealed state, thereby unsealing the interface; and, causing the isolating valve to assume its sealed state, thereby sealing the interface.

The method can further comprise steps of: transferring the device from the second chamber to the first chamber; sealing the interface; reducing the pressure within the first chamber, by said pressure regulating mechanism, to the pressure at the exterior of the system and the fluid-containing body by allowing said fluid to escape from the first chamber; extracting the device from the first chamber.

The method can further comprise steps of: providing the system with a cover; disengaging the cover with the proximal portion for providing access to the first chamber for insertion of the device therein; and engaging the cover with the proximal portion for sealing the first chamber, at least when the interface is sealed.

According to another aspect of the presently disclosed subject matter, there is provided a system for use with a fluid-containing body having a body wall with an opening and defining a body interior, and for use with a device to be inserted by the system via the opening into the fluid-containing body. The system has a central axis and comprises: a proximal portion configured for being attached to the body wall when mounting the system in the opening, and having a first chamber configured for receiving the device therein; and a distal area having a second chamber configured for receiving the device from the first chamber. The second chamber is separated from the first chamber by a sealable interface. At least when the interface is sealed, and the system is mounted within the opening, the second chamber is configured to be exposed to the body interior along a part of its circumference via at least one chamber opening formed therein. The interface, when unsealed, is configured to allow passage therethrough of the device along the central axis between the first and second chambers.

According to this aspect of the presently disclosed subject matter, when the system is introduced into the opening of the fluid-containing body, the fluid within the fluid-containing body is able to enter into the second chamber, also when no device is introduced into the fluid-containing body. On the other hand, when the device is introduced into the fluid-containing body, the fluid can be in communication with the device due to the exposure of the second chamber body interior (i.e., to the fluid within the fluid-containing body).

The second chamber can have a bottom opposite the interface, with an inner surface facing an interior of the second chamber, and an outer surface facing an exterior of the distal area.

The interface can be constituted by an isolating valve configured for assuming a sealed state, in which the interface is sealed, and an unsealed state in which the interface is unsealed.

The isolating valve can comprise a stopper movable along the central axis for providing the sealed and the unsealed states of the isolating valve.

The isolating valve can further comprise an actuator configured for moving the stopper towards the first chamber, thereby causing the isolating valve to assume its sealed state.

The actuator and the stopper can be disposed within the second chamber. The actuator can be associated with the bottom of the second chamber.

The system can further comprise a pressure regulating mechanism. When the system is mounted within the opening, the pressure regulating mechanism can be configured for regulating pressure within the first chamber between pressure at an upper exterior of the proximal portion and pressure at the body interior. The pressure at the upper exterior of the proximal portion can be the pressure of the fluid within the fluid-containing body.

The pressure regulating mechanism can comprise a pressure regulating valve having a first portion configured for defining a first fluid path with the body interior, and a second portion configured for defining a second fluid path with the first chamber. The pressure regulating valve can be configured for assuming an open state in which fluid communication is established between the first and second fluid paths, thereby increasing pressure within the first chamber to the pressure at the body interior, and a closed state in which fluid communication between the first and the second fluid paths is obstructed.

The pressure regulating mechanism can further comprise a pressure releasing valve having a third portion configured for defining a third fluid path between the first chamber and the upper exterior of the proximal portion for reducing pressure within the first chamber to the pressure at the upper exterior of the proximal portion.

The system can further comprise a cover selectively engageable with the proximal portion for providing access to the first chamber for insertion of the device therein, and for sealing the first chamber, at least when the interface is sealed.

The cover can comprise an aperture configured for allowing the second fluid path to pass therethrough into the first chamber.

When the system is mounted within the opening, an exterior surface of the proximal portion and a portion of the body wall are configured to form a space therebetween, constituting at least a part of the first fluid path.

The system can further comprise a pushing mechanism with a pusher having and upper position and a lower position. The pusher can be configured for displacing the device along the central axis between the upper position in which the device is received within the first chamber and the lower position in which the device is received within the second chamber.

Movement of the pusher between its upper position and its lower position with the device within the system, can be configured to trigger sealing and unsealing of the interface. The trigger can be provided by interaction of the pusher with the stopper by a direct contact therebetween or via the device.

The system can further comprise at least one sensor-receiving unit configured for receiving at least one sensing unit therein and allowing the sensing unit to be at least partially exposed to the body interior.

The sensor-receiving unit can comprise a non-return valve having a normal upper position for preventing fluid communication with an interior of the sensor-receiving unit and a lower position in which fluid communication between the sensing unit received within the sensor-receiving unit and the body interior, is provided.

When the interface is unsealed and the device is received within the second chamber, the second chamber can be configured to expose the device to the body interior along a part of its circumference.

The distal area can comprise an inlet and an outlet configured for exposing the second chamber to body interior, for allowing fluid flow through the second chamber in a direction transverse to the central axis, when the system is mounted in the opening.

According to another aspect of the presently disclosed subject matter, there is provided a method for mounting a device within a fluid-containing body having a body wall with an opening configured for receiving the device therethrough and defining a body interior with a fluid therein. The method comprises steps of:

a. providing a system for use with said fluid-containing body and with said device, said system having a central axis and comprising: a proximal portion having a first chamber; and a distal area having a second chamber separated from the first chamber by a sealable interface;

b. mounting the system in said opening, thereby causing the distal area to extend into the body interior;

c. attaching the proximal portion to the body wall;

d. exposing said second chamber to said fluid along a part of its circumference, thereby allowing said second chamber to be in fluid communication with said fluid;

e. inserting the device into the first chamber while said interface being sealed and the pressure within said first chamber being equal to pressure at the exterior of the system and the fluid-containing body;

f. sealing the first chamber;

g. increasing the pressure within the first chamber, by said pressure regulating mechanism, to the pressure of said fluid;

h. unsealing the interface, thereby allowing passage of the device therethrough along said central axis from the first chamber to the second chamber; and i. transferring the device from the first chamber to the second chamber, thereby accommodating the device within the second chamber.

The method can further comprise a step of sealing the interface, being performed before inserting the device into the first chamber in the step (e).

The method can further comprise steps of: providing the interface in form of an isolating valve configured for assuming a sealed state and an unsealed state; causing the isolating valve to assume its unsealed state, thereby unsealing the interface; and, causing the isolating valve to assume its sealed state, thereby sealing the interface.

The step of transferring the device from the first chamber to the second chamber in the step (g) can be configured for triggering the unsealing the interface in the step (h).

The method can further comprise steps of: providing said system with a pressure regulating mechanism configured for regulating pressure within said first chamber between pressure at the exterior of the system and the fluid-containing body and the pressure of said fluid within said body interior; and increasing the pressure within the first chamber, by said pressure regulating mechanism, to the pressure of said fluid.

The method can further comprise steps of: providing the pressure regulating mechanism with a pressure regulating valve having a first portion configured for defining a first fluid path with the fluid at the body interior, and a second portion configured for defining a second fluid path with the first chamber; and causing the pressure regulating valve to assume an unsealed state, thereby establishing fluid communication between the first and second fluid paths for causing said fluid to pass from said fluid-containing body into said first chamber and increasing pressure therein to the pressure of the fluid at the body interior.

The method can further comprise steps of: providing said pressure regulating mechanism with a pressure releasing valve having a third portion configured for defining a third fluid path between the first chamber and the exterior of the system and the fluid-containing body; and reducing fluid pressure within the first chamber to the pressure at exterior of the system and the fluid-containing body by allowing said fluid to escape from said first chamber to the exterior of the system and the fluid-containing body, thereby allowing access to first chamber for insertion or extraction of said device therefrom.

The method can further comprising steps of: providing the system with a cover; disengaging the cover with the proximal portion for providing access to the first chamber for insertion of said device therein; and engaging the cover with the proximal portion for sealing the first chamber, at least when the interface is sealed.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2C illustrates a cross-sectional view along line A-A in FIG. 2A;

FIG. 3A illustrates the system of FIG. 2C with a device received therein in its first chamber;

FIG. 4A illustrates the system of FIG. 2C with a device received therein in its second chamber;

DETAILED DESCRIPTION OF EMBODIMENTS

Figure 1A:
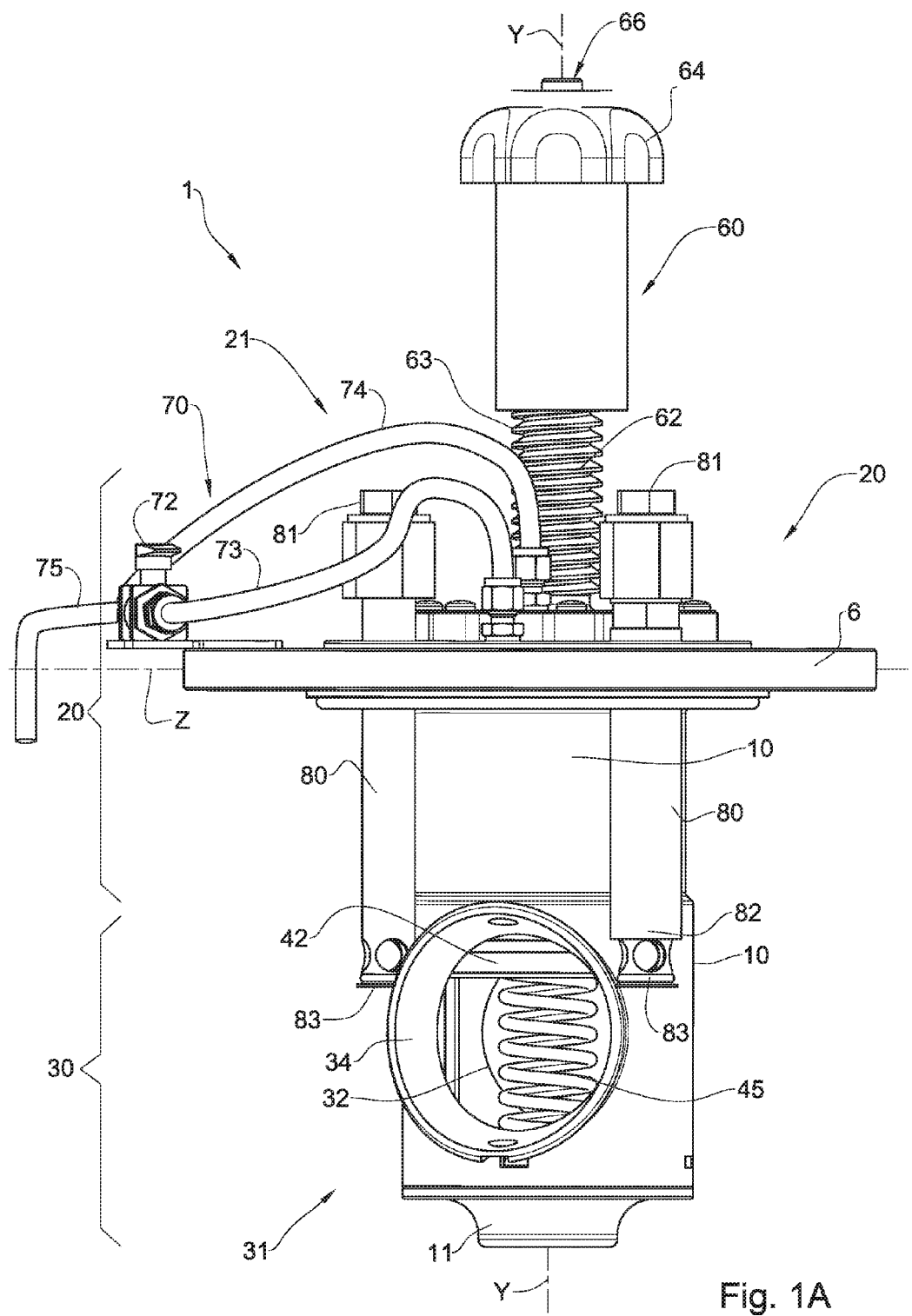
FIG. 1A illustrates a perspective front view of a system in accordance with one example of the presently disclosed subject matter.
Figure 1B:
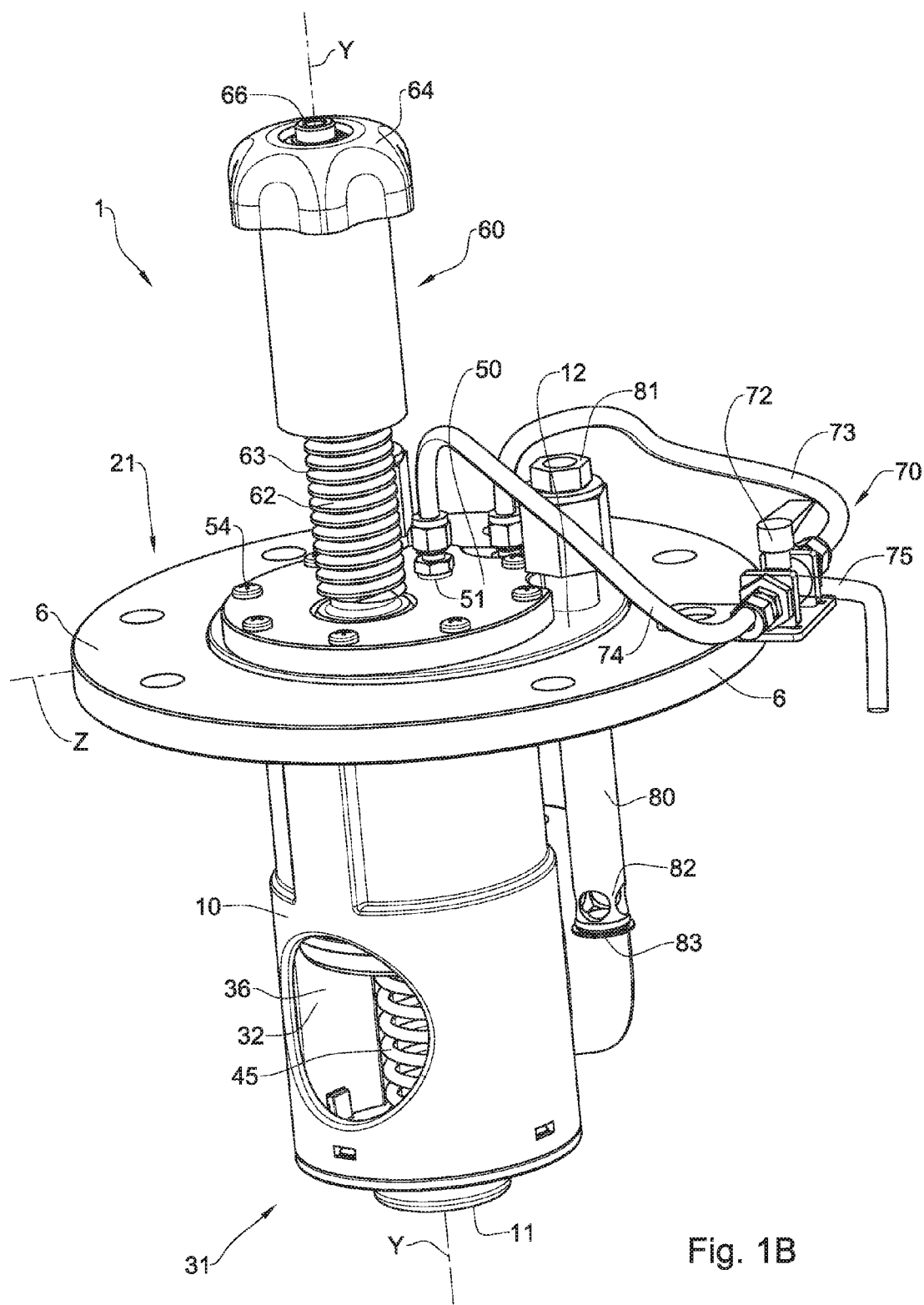
FIG. 1B illustrates a perspective upper back view of the system of FIG. 1A.

Attention is first directed to FIGS. 1A and 1B, illustrating a system 1 for insertion and extraction of a device into a fluid-containing body, and to FIGS. 2A to 2F, illustrating the system 1 being mounted within a fluid-containing body in form of a pipe 100.

The system 1 is intended for allowing multiple insertions and extractions of a device into the pipe 100 having a fluid 110 flowing therein under pressure.

As shown in FIGS. 2A to 2F, the pipe 100 has a pipe wall 102 with an opening 104 (clearly shown in FIGS. 2E and 2F) formed therein. The pipe wall 102 defines a pipe interior 105 allowing passage of the fluid 110 therealong. The opening 104 has a fitting 106 welded thereto, and the system 1 has a respective flange 6 configured to be connected to the fitting 106 by a plurality of bolts 7. A first gasket 8 is disposed between the fitting 106 and the flange 6 for fluid-tightly joining therebetween. The opening 104 can be pre-formed by known techniques such as hot-topping, or regular drilling while passage of fluid within the pipe is stopped.

In general, the system 1 has a proximal portion 20 and a distal area 30, being separated by a sealable interface in form of an isolating valve 40.

The system 1 further includes a housing 10 with a central axis Y along which a device (not shown) can be manipulated within the housing 10, as it is explained below with respect to FIGS. 3A, 3B, 4A and 4B. The housing 10 has a bottom 11, a top 12, a first chamber 22, being associated with the proximal portion 20 and a second chamber 32 encompassing a portion of the distal area 30. The top 12 is disposed at the top of the first chamber 22, and the bottom 11 is disposed at the bottom of the second chamber 32. The first chamber 22 is configured for receiving the device from an exterior of the system 1, and the second chamber 32 is configured for receiving the device from the first chamber 22 and operably accommodating and encapsulating the device therein.

The flange 6, which also constitutes a part of the proximal portion 20, is fixedly connected to the housing 10, and allows attaching the proximal portion 20 to the pipe wall 102 when the system is received within the opening 104.

The isolating valve 40 has a stopper 42 with a first side 43 (shown in FIG. 2D) facing the first chamber 22 and a second side 44 disposed in its opposite direction, facing the second chamber 32.

The stopper 42 is mounted to the bottom 11 via an actuator in form of a spring 45, allowing the stopper 42 to move along the central axis Y within the second chamber 32 for providing two states of the isolating valve 40: a sealed state and an unsealed state. In its sealed state, shown in FIGS. 1A to 2F, the isolating valve 40 isolates the first and the second chambers 22 and 33 from each other and prevents passage of the device therebetween. In its unsealed state, the isolating valve 40 allows passage of the device between the first and the second chambers 22 and 33, along the central axis Y. In its sealed state, the isolating valve 40 defines the border between the first and the second chamber 22 and 32. In its normal state, the spring 45 tends to move the stopper 42 towards the first chamber 22, thereby causing the isolating valve 40 to assume its sealed state.

When the system 1 is mounted within the opening 104, the second chamber 32 is exposed to the pipe interior 105 along a part of its circumference via an inlet 34 and an outlet 36 formed therein. The inlet 34 and the outlet 36 allow the fluid 110 to flow through the second chamber 32 in a direction transverse to the central axis Y. Moreover, in this position of the system, the entire distal area 30 is in fluid communication with the fluid 110.

When the isolating valve 40 is in its sealed state, and no device is received within the second chamber 32, the fluid 110 is able to pass through the second chamber 32 via the inlet 34 and the outlet 36. On the other hand, when the device is received within the second chamber 32, the inlet 4 directs the fluid 110 to enter into the second chamber 32, establishing fluid communication with the device.

The system 1 further has a cover 50 selectively engageable with the a rim 14 of the top 12 for providing access to the first chamber 22 for insertion of the device thereinto and for preventing access to the first chamber 22 and sealingly placing the device therein. At the engagement of the cover 50 with the rim 14, a second gasket 52 fluid-tightly joins therebetween, thereby providing sealing between the exterior of the system 1 and the first chamber 22. When the cover 50 is engaged with the top 12, a plurality of bolts 54 are used for fixing the cover 50 to the top 12.

When the cover 50 is disengaged from the top 12, the device can be introduced into the first chamber 22, and by engaging the cover with the top 12, while the isolating valve is in its sealed state, the device can be sealingly disposed within the first chamber 22. At this position of the device, it can be transferred into the second chamber 32, as described below.

Figure 2A:
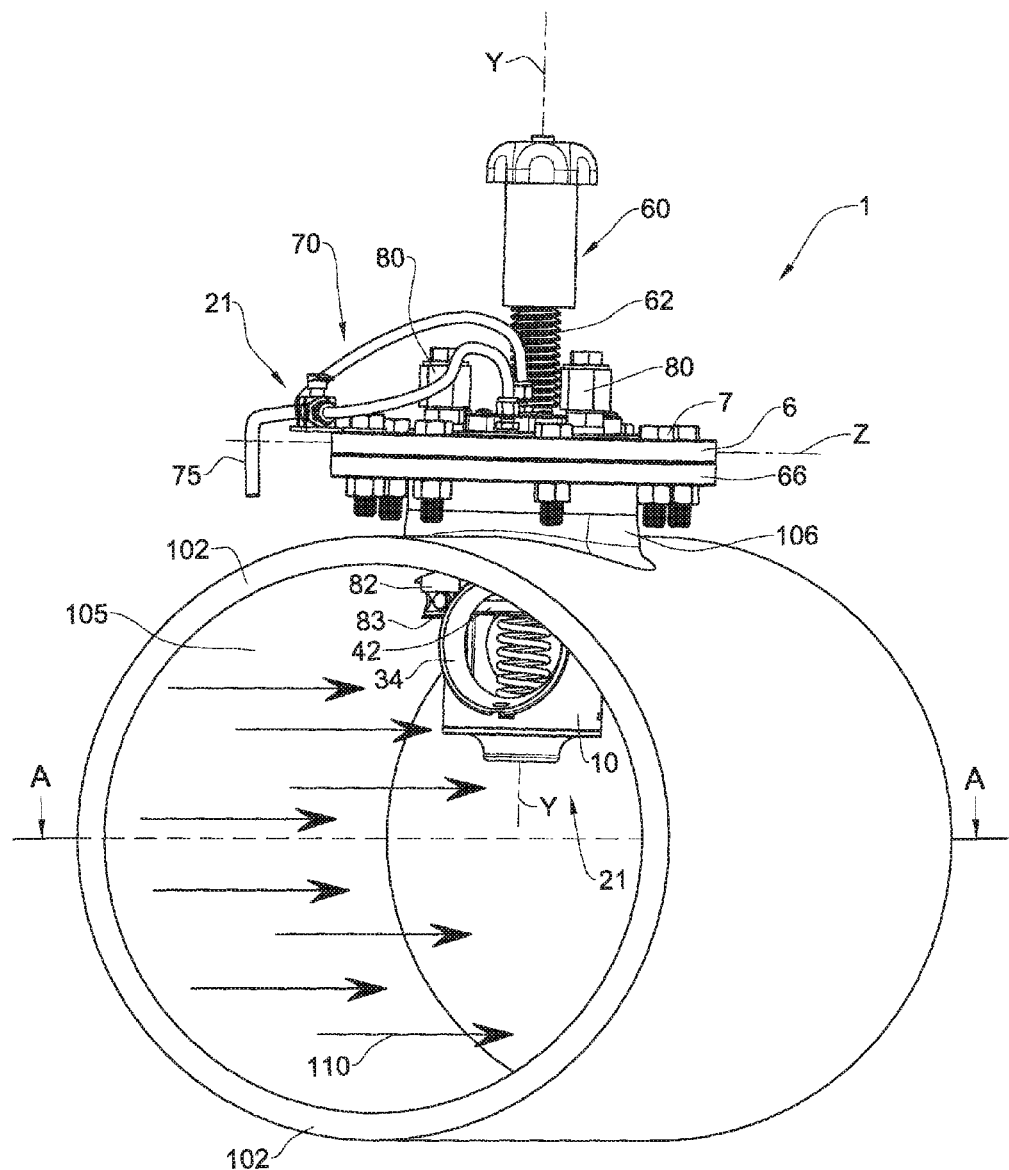
FIG. 2A illustrates a perspective side view of the system of FIG. 1A, being received within a pipe.
Figure 2B:
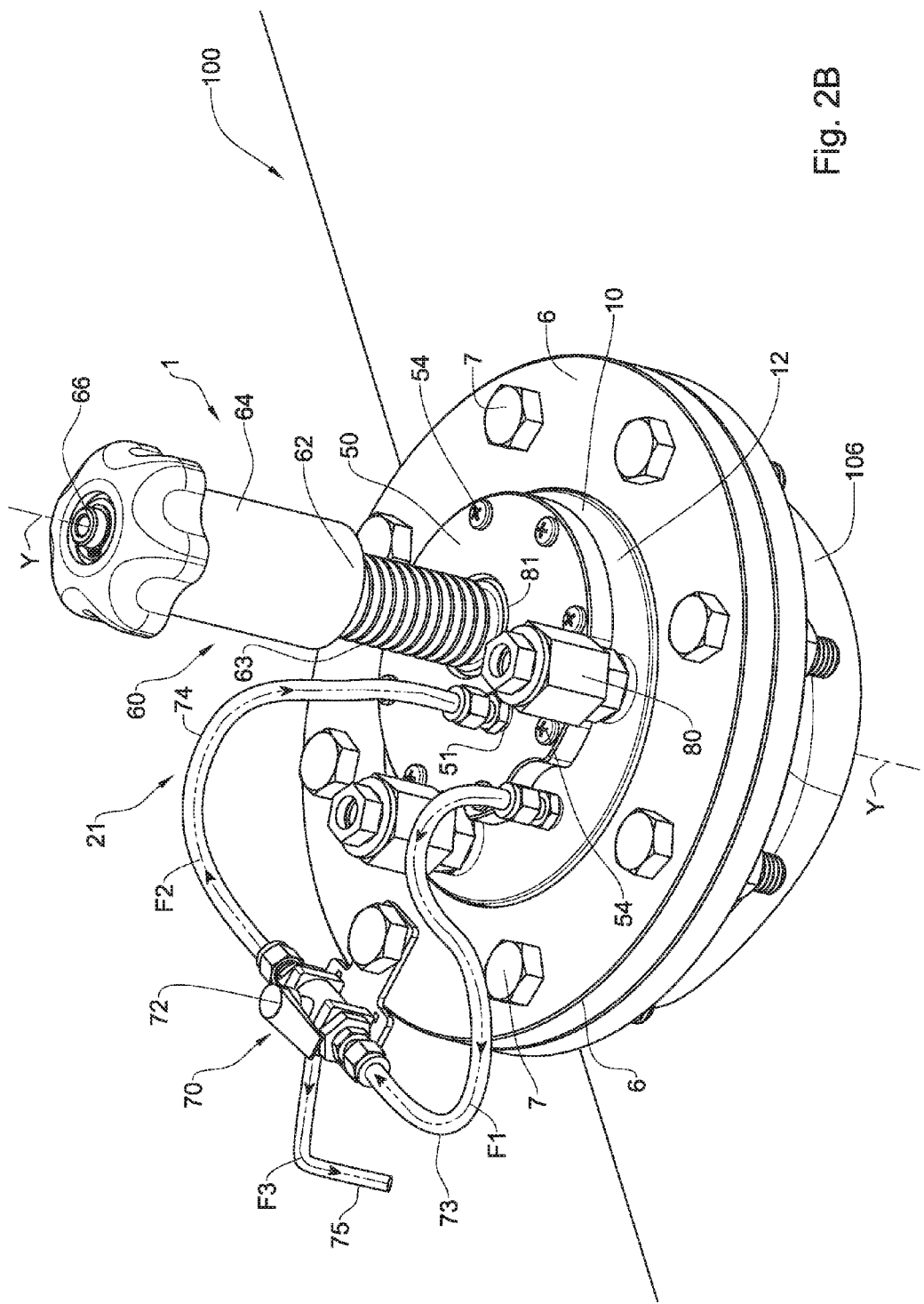
FIG. 2B illustrates a perspective upper view of the system of FIG. 2A.
Figure 2D:
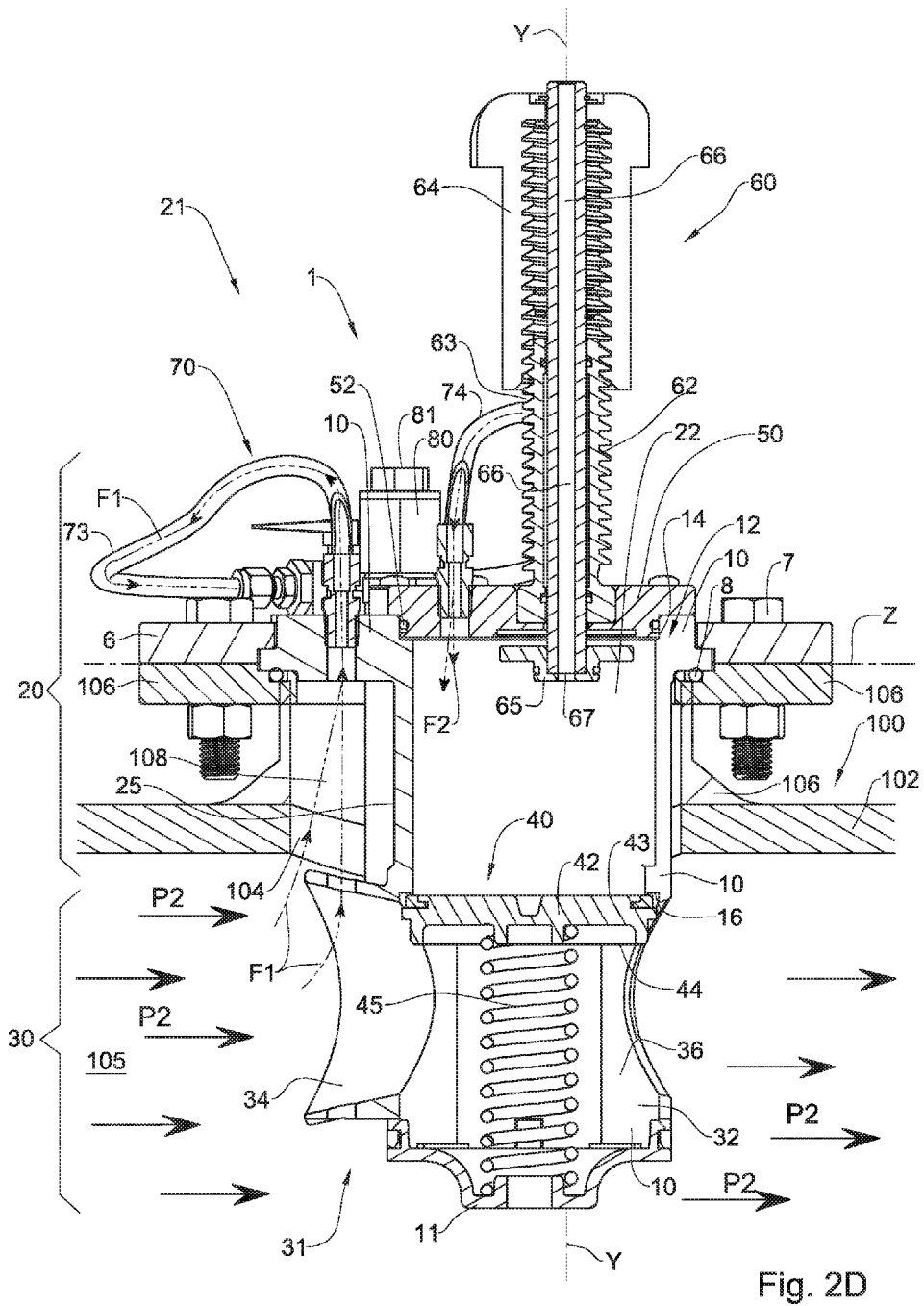
FIG. 2D is an enlarged view of a portion A1 of FIG. 2C.
Figure 2E:
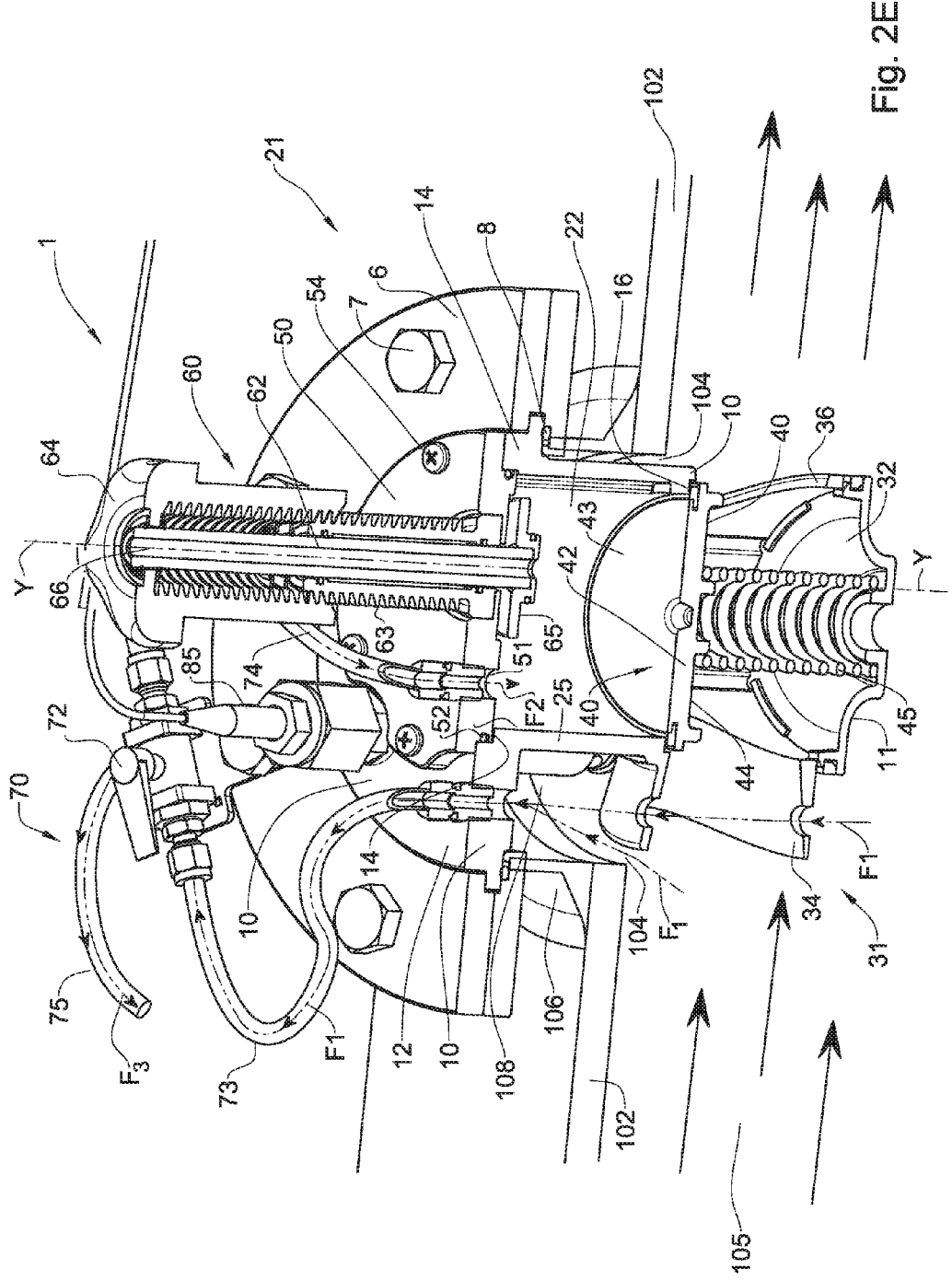
FIG. 2E illustrates a perspective upper view of the system of FIG. 2D.
Figure 2F:
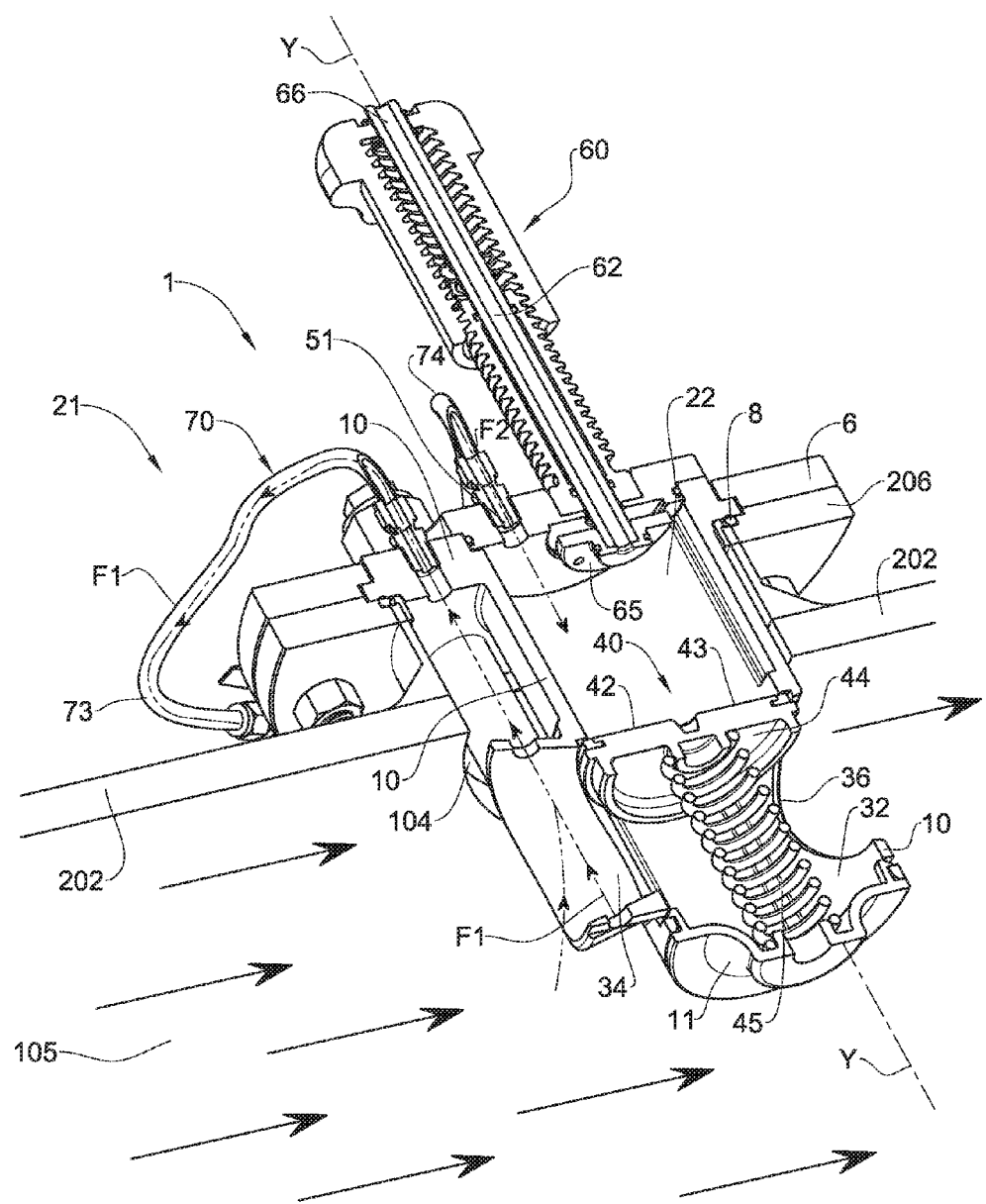
FIG. 2F illustrates a perspective lower view of the system of FIG. 2D.

The system 1 further has a pressure regulating mechanism 70 configured for regulating pressure within said first chamber 22 between pressure at an upper exterior 21 of the proximal portion 20 (i.e., an atmospheric pressure), indicated in FIGS. 2C and 2D by P1 and pressure within the pipe interior 105, indicated in FIGS. 2C and 2D by P2, while the following condition is fulfilled: P2>P1. The upper exterior 21 is the area located above a line Z being shown in the drawings. The pressure P1 is the pressure of air at the exterior of the system 1 and the pipe 100. The pressure P2 is the pressure of the fluid 110. The pressure regulating mechanism 70 is configured for regulating the pressure within the first chamber 22 by allowing the fluid 110 to enter into the first chamber 22 and by allowing the fluid 110 to escape from the first chamber 22.

When the pressure within the first chamber 22 is equal to P1, i.e., no fluid 110 but air is located therein, insertion and extraction of the device from the first camber 22 is allowable. On the other hand, when the pressure within the first chamber 32 is equal to P2, i.e., the fluid 110 from the interior of pipe 100 is introduced therein, transferring of the device from the first chamber 22 to the second chamber 32 is facilitated and becomes much easier. When the pressure within the first chamber is P2, there is much less resistance generated by the fluid 110 within the second chamber 32 to transferring of the device thereto. It should also be indicated that when the pressure within the first chamber 22 becomes equal to the pressure P2 of the fluid 110, extraction of the device from the second chamber 32 to the first chamber 22 is also facilitated. The operation of the pressure regulating mechanism 70 allows manipulation of the device between the first and the second chambers 22 and 32 while the fluid 110 under pressure P2 is located in both chambers.

The pressure regulating mechanism 70 has a pressure regulating valve 72 connected to a first portion in form a first conduit 73 constituting a part of a first fluid path F1 (shown in FIGS. 2D to 2F) with the pipe interior 105. The pressure regulating valve 72 is also connected to a second portion in form a second conduit 74 defining a second fluid path F2 with the first chamber 22. When the system 1 is mounted within the opening 104, the first fluid path F1 also passes via a space 108 formed between an exterior surface 25 of the proximal portion 20 and a portion of the pipe wall 102 and an interior of the fitting 106.

The pressure regulating valve 72 is able to assume an open state in which fluid communication is established between said first and second fluid paths F1 and F2, allowing fluid to pass from the interior of the pipe 100 to the first chamber 22, thereby increasing pressure therein to the pressure P2, and a closed state in which fluid communication between the first and the second fluid paths is obstructed, and fluid flow from the pipe 100 to the first chamber 22 is stopped. The second conduit 74 is connected to the cover 50 for allowing the second fluid path F2 to pass though an aperture 51 formed within the cover 50.

In addition, the pressure regulating mechanism 70 can be used for equaling the pressure P1 at the upper exterior 21 of the proximal portion 20 (i.e., an atmospheric pressure) with the pressure within the first chamber 22, thereby providing access to the first chamber 22 for insertion and extraction of the device therefrom, while the pressure within the first chamber 22 is equal to the pressure P1. This ability of the pressure regulating mechanism 70 is provided by the pressure regulating valve 72 which constitutes a pressure releasing valve. The pressure regulating valve 72 has a third portion constituted by a third conduit 75 defining a third fluid path F3 with between the first chamber 22 and the exterior of the system 1 and the pipe 100.

The pressure regulating valve 70 has a third state in which fluid communication is established via the third fluid path F3. At this position of the pressure regulating valve, the fluid 110 escapes from the first chamber 22 to the exterior of the system 1 and the pipe 100, and thereby fluid pressure within the first chamber 22 is reduced from P2 to P1. After the pressure within the first chamber is reduced to P1, access to first chamber 22 for insertion or extraction of the device therefrom is allowed.

The system 1 further comprises a pushing mechanism 60 with a pusher 62 having a thread 63, a handle 64 and a base member 65. The pusher 62 is received within the cover 50 and threadably displaceable therewithin by a user rotating the handle 63, between an upper position and a lower position.

When the device is received within the first chamber 32, and the base member 65 is engaged with the device, rotation of the pusher 62 displaces the device along the central axis Y between the upper position in which the device is received within the first chamber 22 and the lower position in which the device is received within the second chamber 32. It should be indicated that when the pusher 62 is displaced between its upper and lower positions, the pressure within the first chamber is P2, i.e., equal to the pressure within the second chamber 32 and within the pipe 100.

Movement of the pusher 62 between its upper and lower positions with the device within the system 1 triggers sealing and unsealing of the isolating valve 40. This triggering is resulted from a pushing force applied by the pusher 62 on the device during its movement to the lower position, which in turn applies a pushing force on the stopper 42. This pushing force results in unsealing of the first chamber 22 and downward movement of the stopper 42 towards the bottom 11. When the pusher 62 is moved towards its upward position, the spring 45 pushes the stopper 42 and the device together therewith. Thereby, movement of the pusher 62 towards its upper position triggers the isolating valve 40 to assume its sealed state.

The pusher 62 has a channel 66 extending along its length. The channel 66 can accommodate therein one or more electric cables required for the operation of the device. The channel 66 has a sealing element (shown in FIG. 2D) at its distal end, configured for isolating the first chamber 22 from the exterior of the system 1 so as to prevent fluid to escape from the first chamber 22 when disposed therein.

The system 1 further has two sensor-receiving units 80. Each sensor-receiving unit is adapted to receive therein a sensing unit 85 (shown in FIG. 2E) for allowing the sensing unit 85 to be exposed to the fluid 110 within the pipe 100. Each sensor-receiving unit 80 has an upper open end 81 through which the sensing unit 85 can be received, and a lower end 82 in which a non-return valve 83 is located. The non-return valve 83 has a normal upper position for preventing fluid communication with an interior of the sensor-receiving unit and a lower position in which fluid communication between the sensing unit 85 received within the sensor-receiving unit 80 and the pipe interior 105, is provided. When no sensing unit 85 is received within the sensor-receiving unit 80, the non-return valve is disposed in its upper position, and when the sensing unit 85 is received within the sensor-receiving unit 80, the non-return valve is disposed in its lower position. The non-return valve 83 has a spring (not shown) that tends reverting the non-return valve 83 to its upper position.

Figure 3B:
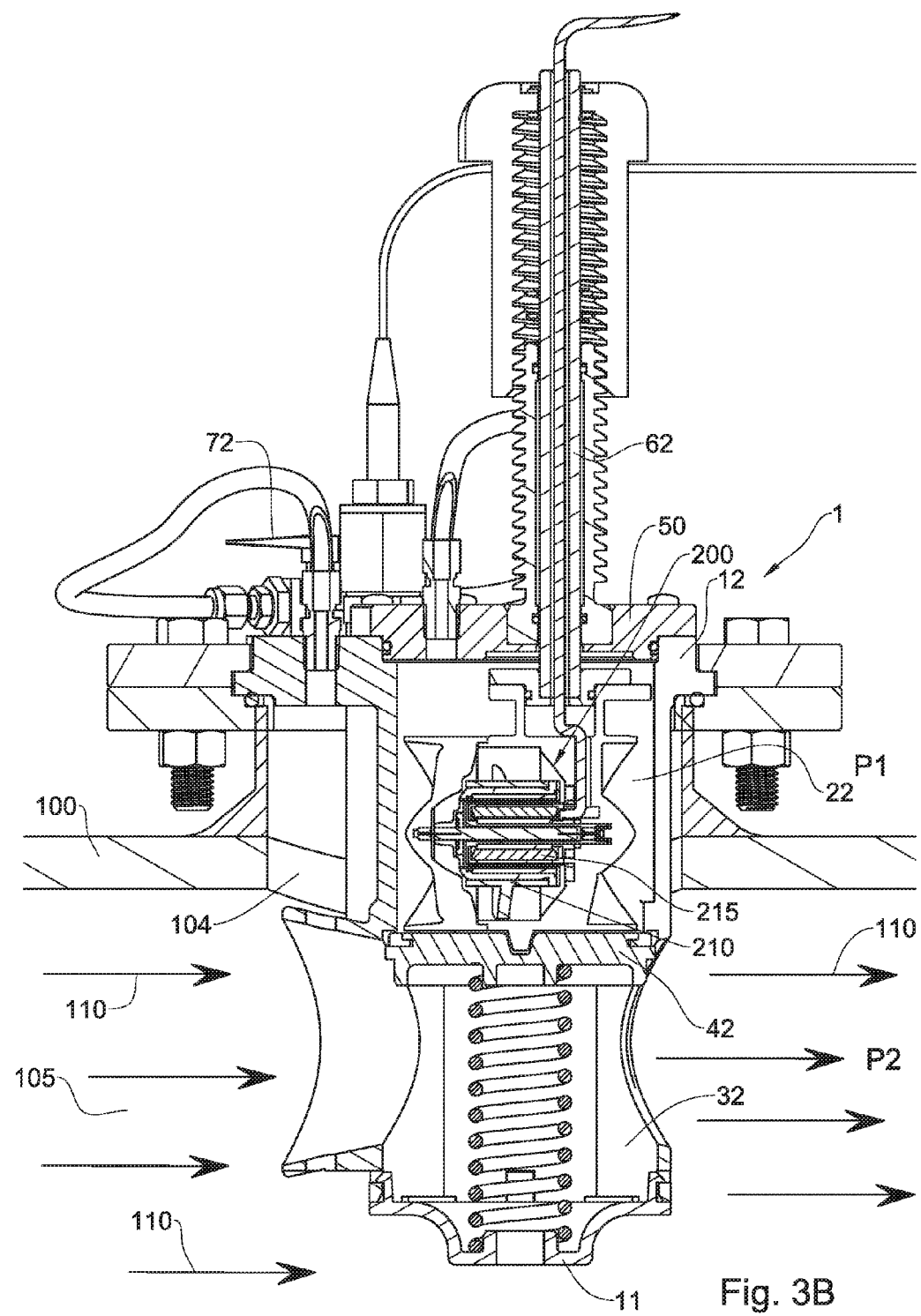
FIG. 3B is an enlarged view of a portion A2 of FIG. 3A.

Attention is now made to FIGS. 3A, 3B, 4A and 4B, illustrating the system 1 being mounted within the opening of the pipe 100 with a device, in form of an energy generating unit 200 received therein. In FIGS. 3A and 3B the energy generating unit 200 is received within the first chamber 22, and in FIGS. 4A and 4B, the energy generating unit 200 being introduced into the interior of the pipe 100 and being accommodated within the second chamber 32.

The description below is made to explain the method of using the system 1 for manipulation of the energy generating unit 200 between the first and the second chambers 22 and 32 while the fluid 110 flows within the pipe 100, i.e., the pipe 100 is under fluid pressure P2.

The energy generating unit 200 has a rotor 210 and a stator 215, configured for generating an electric energy by transforming the flow energy of the fluid 110 within the pipe 100 into an electric power. The device 200 is operative when received within the second chamber 32 by allowing the fluid 110 to pass through the second chamber 32 via the inlet 34 and the outlet 36, thereby rotating the rotor 210. The interaction between the rotor 210 and the stator 215 generates an electric power by known techniques. The device has a controlling unit 220 configured for collecting the electric power. The collected electric power can be used by the sensing unit 85 being connected to the controlling unit 220 for measuring different parameters of the fluid 110. The collected electric power can also be used by other entities or users.

Reference is first made to FIGS. 3A and 3B, for explaining the manner of introduction of the energy generating unit 200 into the first chamber 22 prior to its transferring into the second chamber 32.

While the pipe 100 in under pressure P2 of the fluid 110 flowing therein, the isolating valve 40 is in its sealed state. In this state, the isolating valve 40 isolates the first and the second chambers 22 and 32 from each other and prevent passage of the energy generating unit 200 therebetween. In order to open the first chamber 22 for introduction of the energy generating unit 200 therein, it should be verified that no fluid is located within the first chamber 22 and that the pressure therein is equal to the atmospheric pressure P1. For this, the pressure regulating valve is forced to assume its third state for allowing the fluid within the first chamber 22 (if exists) to escape therefrom.

Afterwards, the cover 50 can be disengaged from the top 12, for providing access to the first chamber 22, and the energy generating unit 200 can be introduced into the first chamber 22. After this stage, the cover 50 can be sealingly engaged with the top 12, for sealingly enclosing the energy generating unit 200 within the first chamber 22. Now, the pressure within the first chamber 22 is P1 and the pressure within the second chamber 32 is P2, while P2>P1. This exact position is shown in FIGS. 3A and 3B.

In order to allow introduction of the energy generating unit 200 into the second chamber 32, the pressure within the first chamber 22 should be equaled with the pressure within the second chamber 32, i.e., raised to P2. For this, the pressure regulating valve 72 is forced to assume its open state, resulting in passage of the fluid 110 into the first chamber 22 and raising the pressure therein to P2. Afterwards, the pressure regulating valve 72 is forced to assume its closed state. Now, the energy generating unit 200 can be easily transferred into the second chamber 32.

For transferring the energy generating unit 200 into the second chamber 32, the pusher 62 is displaced toward its lower position by being screwed, thereby pushing the energy generating unit 200 into the second chamber 32. The movement of the energy generating unit 200 into the second chamber 32 causes the energy generating unit 200 to push the stopper 42 toward the bottom 11 and the spring 45 to contract respectively. This operation causes the isolating valve 40 to assume its unsealed state.

Figure 4B:
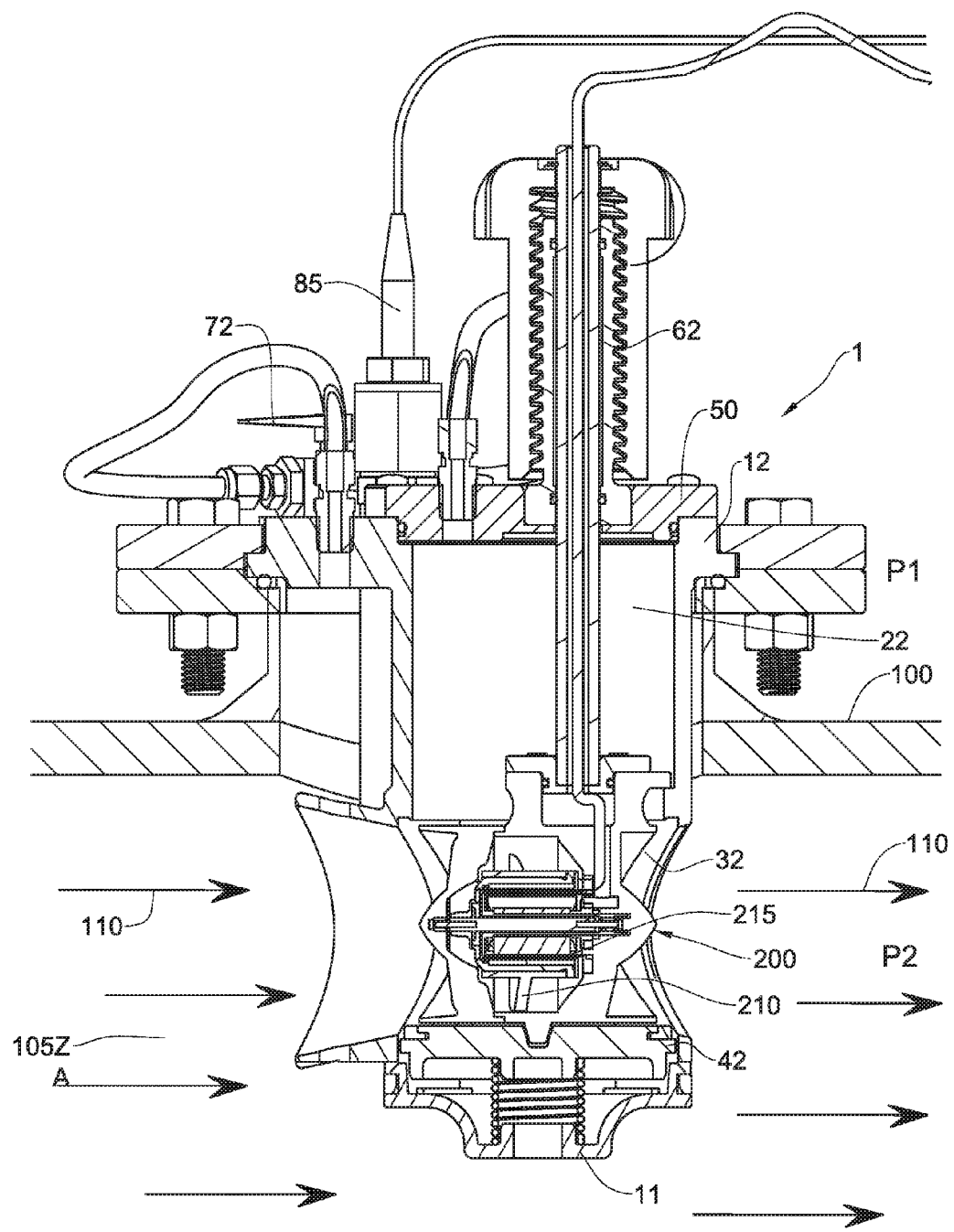
FIG. 4B is an enlarged view of a portion A3 of FIG. 4A.

FIGS. 4A and 4B illustrate the result of the above operation of the pusher 62, in which the device is fully received within the second chamber 32. At this position, the energy generating unit 200 is encapsulated within the second chamber 32, and supported thereby, while the fluid 110 can easily pass therethrough for rotating its rotor 210 and thereby operating it.

When the energy generating unit 200 should be extracted from the pipe 100 for its replacement or for maintenance reasons, the pusher 62 should be displaced to its upper position. This will result in disposition of the energy generating unit 200 within the first chamber 22 and assumption of the isolated state of the isolating valve 40. At this position, the pressure regulating valve 72 is forced to assume its third state for reducing the pressure within the first chamber 22 to P1. At the final stage, the cover 50 can be safely disengaged from the top 12, and the energy generating unit 200 can be extracted from the first chamber 22.

Figure 5A:
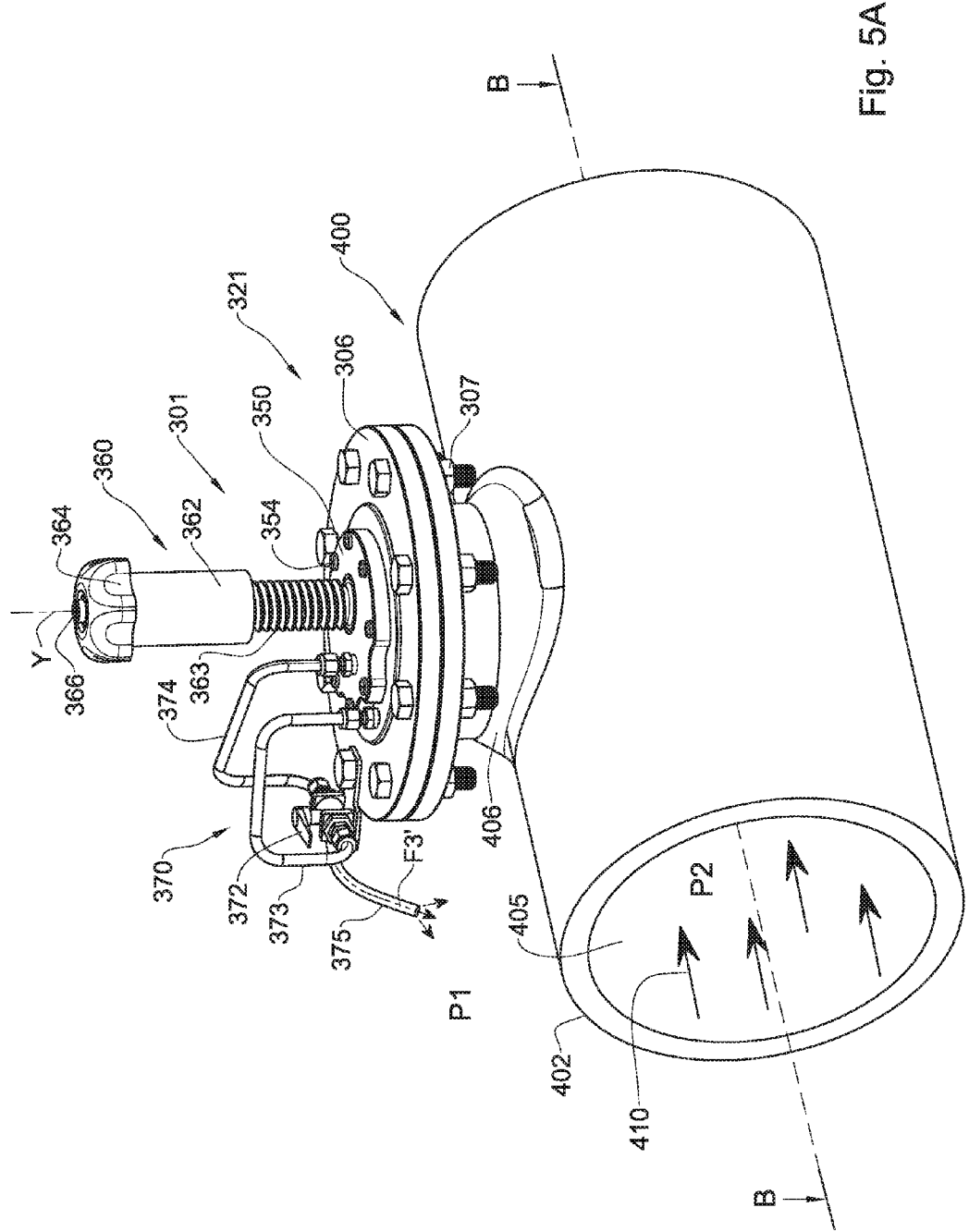
FIG. 5A illustrates a perspective front view of a system, being received within a pipe, in accordance with another example of the presently disclosed subject matter.
Figure 5B:
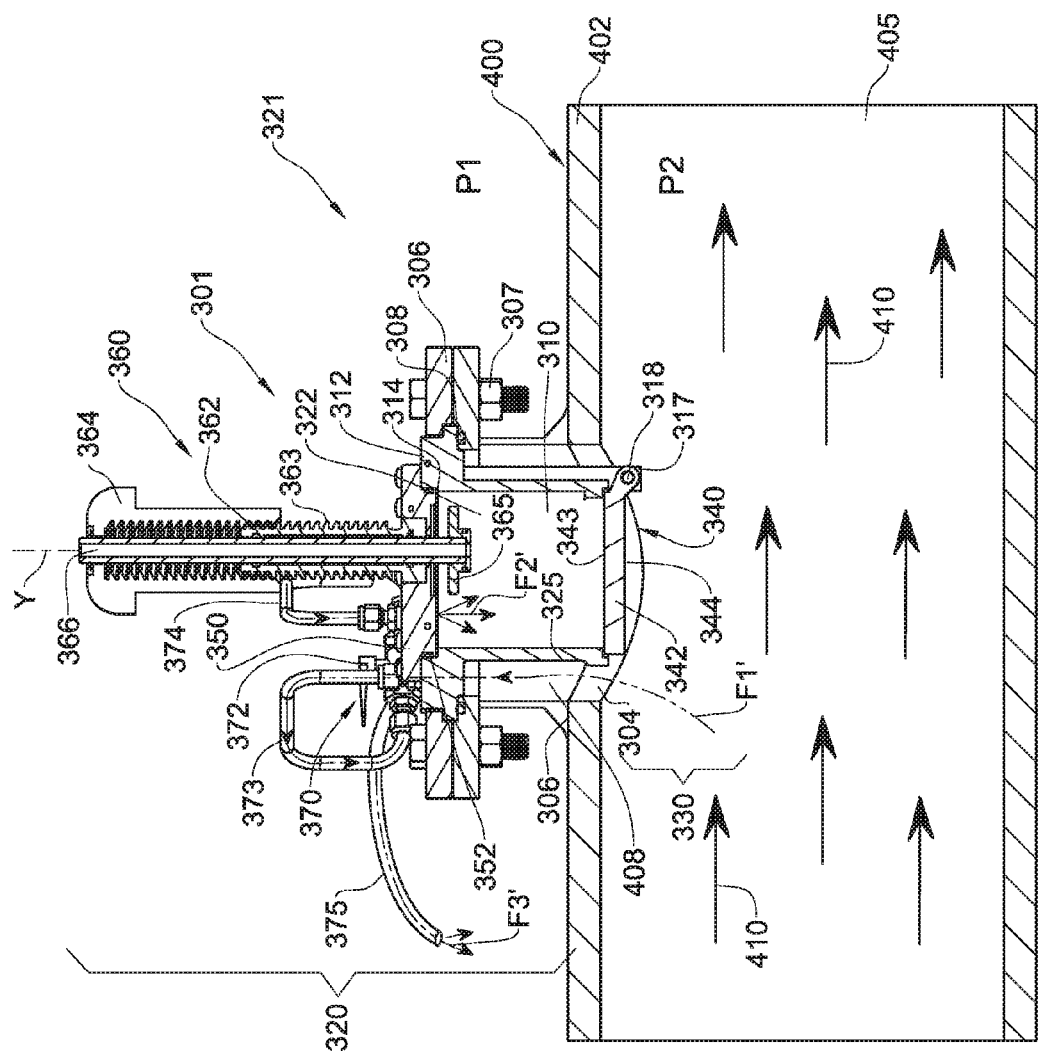
FIG. 5B illustrates a cross-sectional view along line B-B in FIG. 5A.

Attention is now directed to FIGS. 5A and 5B, illustrating a system 301 for insertion and extraction of a device into a fluid-containing body, being mounted within a fluid-containing body in form of a pipe 400.

The system 301 is intended for allowing multiple insertions and extractions of a device into the pipe 100 having a fluid 410 flowing therein under pressure.

The pipe 400 has a pipe wall 402 with an opening formed therein. The pipe wall defines a pipe interior 405 allowing passage of the fluid 410 therealong. The opening 404 has a fitting 406 welded thereto, and the system 301 has a respective flange 306 configured to be connected to the fitting 406 by a plurality of bolts 307. A first gasket 308 is disposed between the fitting 406 and the flange 306 for fluid-tightly joining therebetween. The opening 404 can be pre-formed by known techniques such as hot-topping, or regular drilling while passage of fluid within the pipe is stopped.

In general, the system 301 has a proximal portion 320 and a distal area 330, being separated by a sealable interface in form of an isolating valve 340. The distal area 330 is in full fluid communication with the fluid 410.

The system 301 further includes a housing 310 with a central axis Y along which a device (not shown) can be manipulated within the housing 310. The housing 310 has a top 312, a first chamber 322, being associated with the proximal portion 320. The top 312 is disposed at the top of the first chamber 322. The first chamber 322 is configured for receiving the device from an exterior of the system 301, and the distal area 330 is configured for receiving the device from the first chamber 322 and accommodating the device thereat.

The flange 306, which also constitutes a part of the proximal portion 320, is fixedly connected to a housing 310, and allows attaching the proximal portion 320 to the pipe wall 102 when the system is received within the opening 104.

The isolating valve 340 has a stopper 342 with a first side 343 facing the first chamber 322 and a second side 344 disposed in its opposite direction, facing the distal area 330.

Figure 5C:
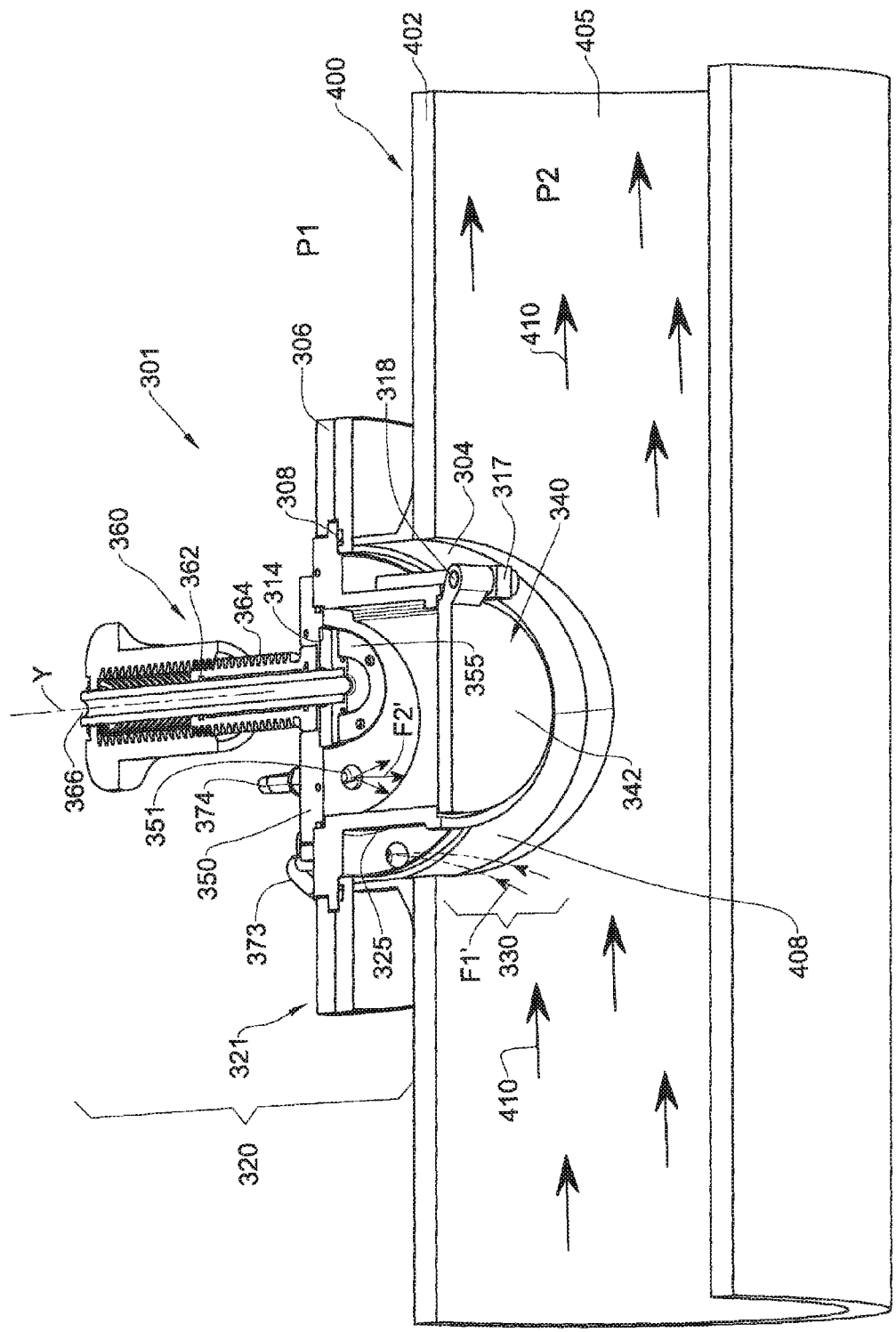
FIG. 5C illustrates a bottom view of the system of FIG. 5B.

The stopper 342 is pivotally mounted to a mounting part 317 by a pivot 318 and having an internal actuator in form of a spring (not shown) associated with the pivot 318. The stopper 342 is rotatably movable with respect to the pivot 318 for providing two states of the isolating valve 340: a sealed state and an unsealed state. In its sealed state, shown in FIGS. 5B and 5C, the isolating valve 340 isolates the first chamber 322 and the distal area 330 from each other and prevents passage of the device therebetween. In its unsealed state, the isolating valve 340 allows passage of the device between the first chamber 322 and the distal area 330, along the central axis Y. In its sealed state, the isolating valve 340 defines the border between the first chamber 322 and the distal area 330. In its normal state, the spring of the isolating valve tends to move the stopper 342 towards the first chamber 322, thereby causing the isolating valve 340 to assume its sealed state.

The system 301 further has a cover 350 selectively engageable with the a rim 314 of the top 312 for providing access to the first chamber 322 for insertion of the device thereinto and for preventing access to the first chamber 322 and sealingly placing the device therein. At the engagement of the cover 350 with the rim 314, a second gasket 352 fluid-tightly joins therebetween, thereby providing sealing between the exterior of the system 301 and the first chamber 322. When the cover 350 is engaged with the top 312, a plurality of bolts 354 are used for fixing the cover 350 to the top 312.

When the cover 350 is disengaged from the top 312, the device can be introduced into the first chamber 322, and by engaging the cover with the top 312, while the isolating valve 340 is in its sealed state, the device is sealingly disposed within the first chamber 322. At this position of the device, it can be transferred into the distal area 330.

The system 301 further has a pressure regulating mechanism 370 configured for regulating pressure within said first chamber 322 between pressure at exterior 321 of the system 301 (i.e., an atmospheric pressure), indicated by P1 and pressure at the distal area 330 (i.e., pressure of the fluid 110), indicated by P2, while the following condition is fulfilled: P2>P1. The pressure regulating mechanism 370 is configured for regulating the pressure within the first chamber 322 by allowing the fluid 410 to enter into the first chamber 322 and by allowing the fluid 410 to escape from the first chamber 322.

When the pressure within the first chamber 322 is equal to P1, i.e., no fluid 410 but air is located therein, insertion and extraction of the device from the first camber 322 is allowable. On the other hand, when the pressure within the first chamber 332 is equal to P2, i.e., the fluid 410 from the pipe interior 405 is introduced therein, transferring of the device from the first chamber 322 to the distal area 330 facilitated and becomes much easier. When the pressure within the first chamber is P2, there is much less resistance generated by the fluid 410 at the distal area 330 to transferring of the device thereto. It should also be indicated that when the pressure within the first chamber 322 becomes equal to the pressure P2 of the fluid 110, extraction of the device from the distal area 330 to the first chamber 322 is also facilitated. The operation of the pressure regulating mechanism 370 allows manipulation of the device between the first chamber 320 and the distal area 330 while the fluid 410 under pressure P2 is located in the first chamber 320.

The pressure regulating mechanism 370 has a pressure regulating valve 372 connected to a first portion in form a first conduit 373 constituting a part of a first fluid path F1' with the distal area 330. The pressure regulating valve 372 is also connected to a second portion in form a second conduit 374 defining a second fluid path F2' with the first chamber 322. When the system 301 is mounted within the opening 404, the first fluid path F1' also passes via a space 408 formed between an exterior surface 325 of the proximal portion 320 and a portion of the pipe wall 402 and an interior of the fitting 406.

The pressure regulating valve 372 is able to assume an open state in which fluid communication is established between said first and second fluid paths F1' and F2', allowing the fluid 410 to pass from the pipe interior 410 to the first chamber 322, thereby increasing pressure therein to the pressure P2, and a closed state in which fluid communication between the first and the second fluid paths is obstructed, and fluid flow from the pipe 400 to the first chamber 322 is stopped. The second conduit 374 is connected to the cover 350 for allowing the second fluid path F2' to pass though an aperture 351 formed within the cover 350.

In addition, the pressure regulating mechanism 70 can be used for equaling the pressure P1 at the exterior 321 of the proximal portion 320 (i.e., an atmospheric pressure) with the pressure within the first chamber 322, thereby providing access to the first chamber 322 for insertion and extraction of the device therefrom, while the pressure within the first chamber 322 is equal to the pressure P1. This ability of the pressure regulating mechanism 370 is provided by the pressure regulating valve 372 which constitutes a pressure releasing valve. The pressure regulating valve 372 has a third portion constituted by a third conduit 375 defining a third fluid path F3' with between the first chamber 322 and the exterior 321 of the system 301 and the pipe 400.

The pressure regulating valve 370 has a third state in which fluid communication is established via the third fluid path F3'. At this position of the pressure regulating valve 370, the fluid 410 escapes from the first chamber 322 to the exterior 321 of the system 301 and the pipe 400, and thereby fluid pressure within the first chamber 22 is reduced from P2 to P1. After the pressure within the first chamber is reduced to P1, access to first chamber 322 for insertion or extraction of the device therefrom is allowed.

The system further comprises a pushing mechanism 360 with a pusher 362 having a thread 363, a handle 364 and a base member 365. The pusher 362 is received within the cover 350 and threadably displaceable therewithin by a user rotating the handle 363, between an upper position and a lower position.

When the device is received within the first chamber 332, and the base member 365 is engaged with the device, rotation of the pusher 362 displaces the device along the central axis Y between the upper position in which the device is received within the first chamber 322 and the lower position in which the device is received within the distal area 330. It should be indicated that when the pusher 362 is displaced between its upper and lower positions, the pressure within the first chamber is P2, i.e., equal to the pressure of the fluid 410.

Movement of the pusher 362 between its upper and lower positions with the device within the system 301 triggers sealing and unsealing of the isolating valve 340. This triggering is resulted from a pushing force applied by the pusher 363 on the device during its movement to the lower position, which in turn applies a pushing force on the stopper 442. This pushing force results in unsealing of the first chamber 422 and downward movement of the stopper 442 the distal area 330. When the pusher 362 is moved towards its upward position, the spring of the isolating valve 340 pushes the stopper 342 and the device together therewith. Thereby, movement of the pusher 363 towards its upper position triggers the isolating valve 340 to assume its sealed state.

The pusher 363 has a channel 366 extending along its length. The channel 366 can accommodate therein one or more electric cables required for the operation of the device. The channel 366 has a sealing element (shown in FIG. 2D) at its distal end, configured for isolating the first chamber 322 from the exterior of the system 301 so as to prevent fluid to escape from the first chamber 322 when disposed therein.

The invention claimed is:

1. A system for use with a fluid-containing body having a body wall with an opening and defining a body interior, and for use with a device to be inserted and extracted by the system via the opening into the fluid-containing body, the system having a central axis, the system comprising:
   a proximal portion configured for being attached to the body wall when the system is mounted in the opening, the proximal portion having a first chamber configured for receiving the device therein;
   a sealable interface having a first side facing the first chamber and a second side in a direction generally opposite to the first chamber and defining a distal area configured for receiving the device from the first chamber; the sealable interface, when unsealed, being configured to allow passage therethrough of the device along the central axis between the first chamber and the distal area;
   a pressure regulating mechanism configured for regulating pressure within the first chamber between pressure at an upper exterior of the proximal portion and pressure at the distal area; and
   a second chamber encompassing at least a part of the distal area and configured for receiving the device therein; the sealable interface, when unsealed, being configured to allow passage therethrough of the device along the central axis between the first and the second chambers; wherein the second chamber has a bottom generally opposite to the interface, with an inner surface facing an interior of the second chamber, and an outer surface facing the body wall.

2. The system according to claim 1, wherein the pressure regulating mechanism comprises a pressure regulating valve having a first portion configured for defining a first fluid path with the distal area, and a second portion configured for defining a second fluid path with the first chamber; the pressure regulating valve being configured for assuming an open state in which fluid communication is established between the first and second fluid paths, thereby increasing pressure within the first chamber to the pressure at the distal area, and a closed state in which fluid communication between the first and the second fluid paths is obstructed.

3. The system according to claim 2, wherein the pressure regulating mechanism further comprises a pressure releasing valve having a third portion configured for defining a third fluid path between the first chamber and the upper exterior of the proximal portion for reducing pressure within the first chamber to the pressure at the upper exterior of the proximal portion.

4. The system according to claim 1, wherein at least when the interface is sealed, and the system is mounted within the fluid-containing body, the second chamber is configured to be exposed to the body interior via at least one chamber opening formed therein.

5. The system according to claim 1, wherein the interface is constituted by an isolating valve configured for assuming a sealed state, in which the interface is sealed, and an unsealed state in which the interface is unsealed.

6. The system according to claim 5, wherein the isolating valve comprises a stopper movable along the central axis for providing the sealed and the unsealed states of the isolating valve.

7. The system according to claim 6, wherein the isolating valve further comprises an actuator configured for moving the stopper toward the first chamber, thereby causing the isolating valve to assume the sealed state.

8. The system according to claim 1, wherein when the system is mounted within the opening, the distal area is in fluid communication with fluid within the body interior and the pressure regulating mechanism is configured for regulating pressure within the first chamber between pressure at an exterior of the system and the fluid-containing body and pressure of the fluid.

9. A method for mounting a device within a fluid-containing body having a body wall with an opening configured for receiving the device therethrough and defining a body interior with a fluid therein, the method comprising:
   providing a system being mounted in the opening, the system having a central axis and comprising: a proximal portion having a first chamber; a sealable interface having a first side facing the first chamber and a second side in a direction opposite the first chamber and defining a distal area configured to be in fluid communication with the fluid; a pressure regulating mechanism configured for regulating pressure within the first chamber; and a second chamber encompassing at least a part of the distal area; wherein the second chamber has a bottom generally opposite to the interface, with an inner surface facing an interior of the second chamber, and an outer surface facing the body wall;
   inserting the device into the first chamber while the interface being sealed and the pressure within the first chamber being substantially equal to pressure at the exterior of the system and the fluid-containing body;
   sealing the first chamber;
   increasing the pressure within the first chamber, by the pressure regulating mechanism, to the pressure of the fluid within the body interior;
   unsealing the interface, thereby allowing passage of the device therethrough along the central axis from the first chamber to the distal area, transferring the device from the first chamber to the distal area, and accommodating the device at the distal area and within the second chamber.

10. The method according to claim 9, further comprising: mounting the system in the opening; attaching the proximal portion to the body wall; exposing the second chamber to the fluid within the body interior via at least one chamber opening formed therein, thereby allowing the second chamber to be in fluid communication with the fluid.

11. The method according to claim 9, further comprising transferring the device between the first and the second chambers, thereby triggering unsealing and sealing of the interface, respectively.

12. The method according to claim 9, further comprising:
providing the pressure regulating mechanism with a pressure regulating valve having a first portion defining a first fluid path with the fluid within the body interior, and a second portion defining a second fluid path with the first chamber;
assuming an open state in which fluid communication is established between the first and second fluid paths, thereby increasing pressure within the first chamber to the pressure of the fluid within the body interior; and
assuming a closed state in which fluid communication between the first and the second fluid paths is obstructed.

13. The method according to claim 9, further comprising:
providing the pressure regulating mechanism with a pressure releasing valve having a third portion configured for defining a third fluid path between the first chamber and the exterior of the system and the fluid-containing body; and
reducing fluid pressure within the first chamber to the pressure at the exterior of the system and the fluid-containing body by allowing the fluid to escape from the first chamber to the exterior of the system and the fluid-containing body, thereby providing access to first chamber for insertion or extraction of the device therefrom.

14. A system for use with a fluid-containing body having a body wall with an opening and defining a body interior with a fluid therein, and for use with a device to be inserted and extracted by the system via the opening into the fluid-containing body, the system having a central axis and comprising:
a proximal portion configured for being attached to the body wall when the system is mounted in the opening, the proximal portion having a first chamber configured for receiving the device therein;
a sealable interface having a first side facing the first chamber and a second side in a direction generally opposite to the first chamber and defining a distal area configured to be in fluid communication with the fluid, and for receiving the device from the first chamber; the sealable interface, when unsealed, being configured to allow passage therethrough of the device along the central axis between the first chamber and the distal area;
a pressure regulating mechanism configured, when the system being mounted within the opening, for regulating pressure within the first chamber between pressure at an exterior of the system and the fluid-containing body and pressure of the fluid within the body interior; and
a second chamber encompassing at least a part of the distal area and configured for receiving the device therein; the sealable interface, when unsealed, being configured to allow passage therethrough of the device along the central axis between the first and the second chambers; wherein the second chamber has a bottom opposite the interface, with an inner surface facing an interior of the second chamber, and an outer surface configured for facing the body wall.

15. The system according to claim 14, wherein the pressure regulating mechanism is configured for regulating the pressure within the first chamber by allowing the fluid to enter into the first chamber and by allowing the fluid to escape from the first chamber.

16. The system according to claim 14, wherein the pressure regulating mechanism comprises a pressure regulating valve having a first portion configured for defining a first fluid path with the fluid within the body interior, and a second portion configured for defining a second fluid path with the first chamber; the pressure regulating valve being configured for assuming an open state in which fluid communication is established between the first and second fluid paths, thereby increasing pressure within the first chamber to the pressure of the fluid within the body interior, and a closed state in which fluid communication between the first and the second fluid paths is obstructed.

17. The system according to claim 16, wherein the pressure regulating mechanism further comprises a pressure releasing valve having a third portion configured for defining a third fluid path between the first chamber and the exterior of the system and the fluid-containing body; the pressure releasing valve being configured for reducing pressure within the first chamber to the pressure at the exterior of the system and the fluid-containing body.

18. The system according to claim 14, wherein at least when the interface is sealed, the second chamber is configured to be exposed to the fluid along a part of a circumference thereof via at least one chamber opening formed therein.

* * * * *